(12) United States Patent
Quehenberger et al.

(10) Patent No.: US 8,443,954 B2
(45) Date of Patent: May 21, 2013

(54) CLUTCH

(75) Inventors: Johannes Quehenberger, Saalbach (AT); Simon Kaimer, Fernitz (AT); Klaus Eder, Heiligenkreuz am Waasen (AT); Todd Ekonen, Howell, MI (US)

(73) Assignee: Magna Powertrain AG & Co KG, Lannach (AT)

( * ) Notice: Subject to any disclaimer, the term of this patent is extended or adjusted under 35 U.S.C. 154(b) by 630 days.

(21) Appl. No.: 12/577,224

(22) Filed: Oct. 12, 2009

(65) Prior Publication Data

US 2010/0089685 A1 Apr. 15, 2010

(30) Foreign Application Priority Data

Oct. 13, 2008 (DE) .......................... 10 2008 051 462
Jun. 8, 2009 (DE) ...................... 20 2009 007 977 U

(51) Int. Cl.
*F16D 28/00* (2006.01)
*B60K 23/08* (2006.01)

(52) U.S. Cl.
USPC ............. 192/84.6; 192/69; 192/90; 74/665 T; 180/249

(58) Field of Classification Search
USPC .................................. 192/84.6, 90
See application file for complete search history.

(56) References Cited

U.S. PATENT DOCUMENTS

| | | | |
|---|---|---|---|
| 3,414,100 A * | 12/1968 | Spencer | 192/90 |
| 4,684,000 A * | 8/1987 | Brown | 192/69.8 |
| 5,016,724 A * | 5/1991 | Steinhagen et al. | 180/197 |
| 5,086,867 A | 2/1992 | Hirota et al. | |
| 5,119,900 A | 6/1992 | Watanabe et al. | |
| 5,307,965 A * | 5/1994 | Worrel | 222/616 |
| 5,407,024 A | 4/1995 | Watson et al. | |
| 5,411,110 A | 5/1995 | Wilson et al. | |
| 5,485,894 A | 1/1996 | Watson et al. | |
| 5,609,219 A | 3/1997 | Watson et al. | |
| 5,934,430 A * | 8/1999 | Kolomeitsev et al. | 192/84.6 |
| 5,954,150 A | 9/1999 | Miller et al. | |

(Continued)

FOREIGN PATENT DOCUMENTS

DE 3801351 A1 8/1989
DE 3822518 A1 1/1990

(Continued)

OTHER PUBLICATIONS

Office Action regarding U.S. Appl. No. 12/577,229 mailed Aug. 24, 2012.

*Primary Examiner* — Richard M. Lorence
(74) *Attorney, Agent, or Firm* — Dickinson, Wright

(57) ABSTRACT

The invention relates to a clutch having two clutch parts which can be brought into engagement in form fitted manner for the torque transfer; and a shift member which is movable in a first direction to bring the clutch parts out of engagement and is movable in a second direction to bring the clutch parts into engagement. A motor is provided for the movement of the shift member in the first direction and a spring element is provided for the movement of the shift member in the second direction.

20 Claims, 17 Drawing Sheets

U.S. PATENT DOCUMENTS

| | | | |
|---|---|---|---|
| 6,000,488 A | 12/1999 | Atkinson | |
| 6,062,330 A | 5/2000 | Watson et al. | |
| 6,263,995 B1 | 7/2001 | Watson et al. | |
| 6,296,590 B1 | 10/2001 | Gassmann | |
| 6,592,487 B2 | 7/2003 | Gassmann | |
| 6,598,721 B2 | 7/2003 | Schmidl | |
| 6,644,428 B2 | 11/2003 | Gady et al. | |
| 7,011,596 B2 | 3/2006 | Haka | |
| 7,096,990 B2 | 8/2006 | Borgen et al. | |
| 7,331,896 B1 | 2/2008 | Kroppe | |
| 7,485,063 B2 | 2/2009 | Nett et al. | |
| 7,546,914 B2 | 6/2009 | Schranz et al. | |
| 7,553,251 B2 | 6/2009 | Nett et al. | |
| 7,694,793 B2 | 4/2010 | Wittkopp et al. | |
| 2002/0074202 A1 | 6/2002 | Schmidl | |
| 2007/0023249 A1 | 2/2007 | Schranz et al. | |
| 2010/0094519 A1* | 4/2010 | Quehenberger et al. | 701/69 |

FOREIGN PATENT DOCUMENTS

| | | |
|---|---|---|
| DE | 10010703 A1 | 9/2001 |
| DE | 10103789 A1 | 9/2001 |
| DE | 10160951 A1 | 7/2002 |
| DE | 102005021460 A1 | 11/2006 |
| DE | 102005021633 | 11/2006 |
| DE | 102006017693 A1 | 11/2006 |
| DE | 102006024941 A1 | 3/2007 |
| DE | 102006043330 A1 | 4/2007 |
| DE | 102008008458 A1 | 9/2008 |
| DE | 102008044791 A1 | 4/2009 |
| JP | 60135327 A | 7/1985 |
| WO | 2005/073602 A1 | 8/2005 |
| WO | 2006/128637 A1 | 12/2006 |
| WO | 2008/027224 A2 | 3/2008 |

* cited by examiner

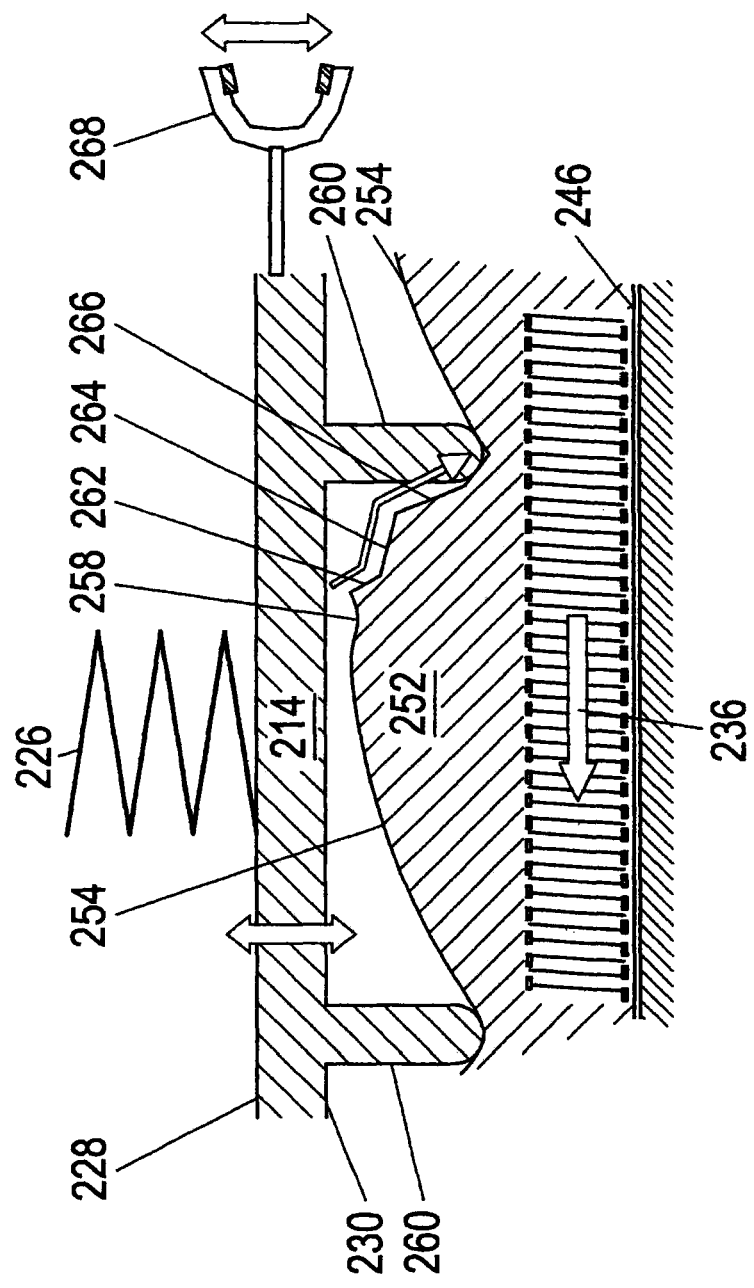

CLUTCH

CROSS-REFERENCE TO RELATED APPLICATIONS

This application claims the benefit and priority of German Patent Application Nos. 102008051462.4, filed Oct. 13, 2008, and 202009007977.5 filed Jun. 8, 2009. The entire disclosures of each of the above applications are incorporated herein by reference.

FIELD

The invention relates to a clutch, in particular to a dog clutch, having two clutch parts which can be brought into engagement in a form fitted manner for torque transfer and a switching element which can be moved in a first direction to bring the clutch parts out of engagement and which can be moved in a second direction to bring the clutch parts into engagement.

BACKGROUND

This section provides background information related to the present disclosure which is not necessarily prior art.

Clutches of the initially named kind and in particular dog clutches are generally known and are, for example, used in motor vehicles, which have a permanently driven primary axle and a secondary axle which is only driven at times, for the deactivation of the secondary axle. The known clutches are actuated, i.e. opened and closed, either by means of a hydraulic or pneumatic actuator or by means of an electric motor. In this respect, there is the problem, in particular with known dog clutches actuated by an electric motor, that they cannot be closed fast enough, whereby the speed of the engagement of the secondary axle is limited.

SUMMARY

This section provides a general summary of the disclosure, and is not a comprehensive disclosure of its full scope or all of its features.

It is the underlying object of the invention to provide a clutch which allows a faster engagement of the two clutch parts.

The clutch in accordance with the invention is in particular characterized in that a motor, in particular an electric motor, is provided for the movement of the shift member in the first direction, i.e. in the opening direction, and a spring element is provided for the movement of the shift member in the second direction, i.e. in the closing direction.

The motor is therefore generally only provided for the disengagement of the clutch parts, whereas the engagement of the clutch parts, in other words the closing of the clutch, takes place by spring force.

The basic idea of the invention in other words therefore comprises the fact that the motor does not act on the shift member in both directions of movement thereof, but rather normally only exerts force in one direction. To open the clutch, the motor acts directly onto the shift member, whereby the spring element is simultaneously tensioned. To close the clutch, the shift member is, in contrast, separated or released from the motor so that the tensioned spring element can relax abruptly and can engage the clutch parts fast while loading the shift element. The system can thus also be called a type of "closing device".

Since the disengagement of the clutch parts is normally a process essentially uncritical in a time respect, the speed of the motor does not have to satisfy any special demands so that a commercial cost-favorable electric motor can be used, for example.

At the same time, a faster engagement of the clutch parts is achieved by the spring element than would be possible by a use of an electric motor for the closing of the clutch.

Due to the faster closing of the clutch by the spring element, it can, for example, contribute to a faster engagement of a deactivated secondary drive axle of a motor vehicle.

Advantageous embodiments of the invention can be seen from the description and from the drawings.

A movement of the shift member in the first direction preferably effects a tensioning of the spring element. The spring element is consequently supplied with energy, that is, so-to-say, charged, by the opening of the clutch. The spring element stores the energy taken up until an engagement of the clutch parts is commanded which is then achieved by a discharge of the spring element. The motor thus satisfies a dual function in that it not only provides a disengagement of the clutch parts, but simultaneously also delivers the energy required to tension or charge the spring element. The spring element therefore so-to-say forms a store for the energy delivered by the motor and required for the closing of the clutch, in particular also for the case that a "tooth-on-tooth" position should initially result on an engagement of the clutch parts.

In a most simple form, the spring element can be a compression spring, in particular a helical compression spring.

In accordance with an embodiment of the clutch in accordance with the invention, a triggering of the spring element takes place by an actuation of the motor in the same direction of rotation which previously effects a tensioning of the spring element. A triggering of the spring element is here to be understood as a release of the tensioned spring element such that the spring element can relax and can move the shift member in the closing direction. A reversal of the direction of rotation of the motor is not necessary for the actuation of the clutch in this embodiment. Both the opening and the closing of the clutch rather take place by an activation of the motor in one and the same direction of rotation.

A transmission mechanism arranged between the motor and the shift member preferably includes at least one actuating ramp and at least one counter-element which is movable relative to the actuating ramp and which cooperates with the actuating ramp such that the shift member is moved, in particular compressed, in the first direction on a sliding of the counter-element up the actuating ramp against the restoring force of the spring element.

It is easy to understand that the number of the counter-elements is preferably the same as the number of actuating ramps. This is not, however, a necessary requirement, i.e. the number of counter-elements can generally also deviate from the number of actuating ramps.

The or each actuating ramp preferably has—viewed in the unwound state—a longer flat ramp section with a small gradient for the opening of the clutch and a shorter steep ramp section with a higher gradient for the closing of the clutch. A high gear ratio is achieved by the longer flat ramp section so that an electric motor with a correspondingly small torque can bias a spring with a comparatively high force. In this manner, the electric motor and components fastened thereto such as a motor control and/or a wiring harness can be made smaller. Due to the shorter steeper ramp section, a short movement is simultaneously sufficient to close the clutch fast.

The actuating ramp is advantageously made directly at the shift member. The shift member can, for example, be made in ring shape or sleeve shape, can surround a shaft and can be displaceable with respect to it, whereas the actuating ramp is formed at an end face side of the shift member facing the counter-element.

The spring element can be arranged between an end face side of the shift member remote from the actuating ramp and an abutment.

The counter-element is preferably moved along the actuating ramp by the motor.

In accordance with an embodiment, the counter-element includes a pin which projects radially out of an actuating shaft which is rotatable relative to the shift member by the motor. The actuating shaft can be driven, for example, by the motor via a worm wheel and a worm.

To open the clutch, the actuating shaft is rotated by the motor such that the pin slides along the longer flat ramp section until it reaches the end of the actuating ramp. The shift member is in this respect displaced on the actuating shaft and against the restoring force of the spring element. To fix the pin at the end of the actuating ramp and thus to fix the clutch in its opened position, a latch recess into which the pin latches can be provided at the end of the actuating ramp. To close the clutch, the actuating shaft is rotated further in the same direction so that the pin is released and "plummets" down the shorter steep ramp section, while the spring element relaxes and moves the shift member in the closing direction.

In accordance with a further embodiment of the clutch in accordance with the invention, the counter-element has a counter-ramp which is formed at an end face side of a counter-gear surrounding the shaft facing the shift member. The counter-gear can, for example, be a worm wheel which is in engagement with a worm driven by the motor.

The counter-ramp can have a rising first ramp section and a second ramp section which falls steeply or is made in step form and in particular includes a steeper first region, a flatter second region and a steeper third section.

In accordance with an embodiment, the first ramp section rises in a flat and in particular linear manner.

Alternatively, the first ramp section can, however, also rise in a non-linear fashion. In this respect, the gradient of the first ramp section preferably reduces in the direction of the highest point of the counter-ramp, i.e. the first ramp section is configured steeper in the first phase of the opening of the clutch. The ramp path can hereby be kept smaller overall. At the same time, the restoring force of the spring element can be adapted to the gradient course of the first ramp section by the connection of springs of different stiffness either in parallel and/after one another or by the use of a spring with a special characteristic.

In this manner, the gradient for the opening of the clutch and the spring rate of the spring element can be matched to one another so that an approximately constant torque is produced at the motor via the stroke. In this respect, the fact is advantageously taken into account that typically the spring force of a spring changes over the stroke. This results, on the one hand, from the fact that springs usually build up a higher restoration force on stronger compression. On the other hand, the spring force can also, however, be selected deliberately so that the spring force is higher at the synchronization point and is smaller in the closed state. The force at the synchronization point is therefore preferably selected to be higher since the actuation of the synchronization device requires an increased force. In the closed state or on the closing of the dog clutch, a smaller force is, in contrast, sufficient. In addition, a higher force on the closing of the clutch can result in unwanted higher jolts.

To achieve a force distribution which is as uniform as possible, at least two actuating ramps and at least two counter-ramps are preferably provided which are each advantageously arranged uniformly distributed over the periphery.

In this embodiment, two ramps therefore respectively slide against one another pair-wise to effect a displacement of the shift member and thus a tensioning or relaxing of the spring element.

The counter-gear can surround a selector sleeve which is seated on the shaft, which is coupled to the shift member and which is displaceable by it relative to the shaft.

Although normally a fast engagement of the clutch parts is desired, it is generally also possible to close the clutch slowly in that the direction of rotation of the counter-element is reversed so that the counter-element slides down the longer flat ramp section again and the shift member is moved slowly in the closing direction by the restoring force of the spring member. This slow closing of the clutch can, for example, be advantageous in the case that light jolts or noises arise on a fast closing of the clutch.

In accordance with a further embodiment of the clutch in accordance with the invention, a triggering of the spring element takes place by an actuation of the motor in a direction of rotation reversed with respect to the direction of rotation which previously effects a tensioning of the spring element. In this case, a reversal of the direction of rotation of the motor is necessary for the closing of the clutch.

In this respect, the electric motor can be driven in both directions to the stop and a recognition of the respective end position of the spindle nut is possible via the evaluation of the power consumption of the electric motor.

A slow closing of the clutch is not permitted by this embodiment. Instead, the triggering of the fast closing of the clutch cannot only take place with the shift member in the end position, i.e. with a completely opened clutch, but during the total stroke, i.e. also with e.g. a half-open clutch.

Advantageously, a return mechanism is arranged between the motor and the shift member and includes a driver device which can be brought into engagement with the shift member to draw the shift member against the restoring force of the spring element in the first direction, i.e. in the opening direction.

The driver device can include a spindle driven by the motor and a spindle nut seated on the spindle at which a driver finger is formed which can be brought into engagement with a projection of the shift member by a rotation of the spindle nut in one direction and which can be released from the projection by a rotation of the spindle nut in the opposite direction.

The return mechanism is preferably made so that the driver finger and the projection are brought into engagement with one another in that the spindle nut is moved into the region of the spindle nut and the direction of rotation of the motor is reversed to draw the shift member in the first direction.

In addition, a trigger mechanism can be provided which prevents an axial movement of the spindle nut when it is rotated to release the driver finger from the projection. The trigger mechanism can e.g. be a freewheel, a detent, a pawl mechanism or another suitable kind of mechanism actuating correspondingly in dependence on the direction.

To ensure that the spindle nut can only rotate slightly about the spindle for the coupling to the shift member or for the release of the shift member and otherwise moves in an axial direction along the spindle, a rotation limiting device is advantageously provided for the limiting of a rotation of the spindle nut.

The rotating spindle device can, for example, include a bar extending parallel to the spindle which is connected in the region of its one end to the shift member and which is guided in the region of its other end in a guide opening of the spindle nut curved in the peripheral direction. The angle of rotation of the spindle nut is defined by the length of the guide opening viewed in the peripheral direction.

Since the clutch in accordance with the invention is, as already mentioned, in particular suitable for the fast engagement of a secondary axle of a motor vehicle only driven at times, the powertrain in accordance with claim 24 also forms a subject matter of the invention.

The invention furthermore relates to a method for the control of a powertrain of a motor vehicle having a drive unit for the generation of a drive torque. a permanently driven primary axle; a first clutch for the transfer of a variable portion of the drive torque to a secondary axle of the motor vehicle; a second clutch for the deactuation of a torque transfer section of the powertrain arranged between the first clutch and the second clutch when the first clutch is opened; and a control unit for the automatic control of the first and second clutches, with a clutch of the kind explained above being used for the second clutch.

In accordance with an advantageous further development of this method, a determination is made whether a wheel slip is present at the primary axle and, starting from a deactuated state of the torque transfer section, the second clutch is closed in dependence on a detected wheel slip at the primary axle.

In this respect, the closing of the second clutch contributes, in dependence on a wheel slip detected at the primary drive axle, to an even faster engagement of the secondary axle since the demand for an additional drive of the secondary axle is, so-to-say, anticipated by the detection of the wheel slip, whereby the closing process of the second clutch can be initiated earlier.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2D is a developed representation of a further alternative ramp ring mechanism;

Figure 13:
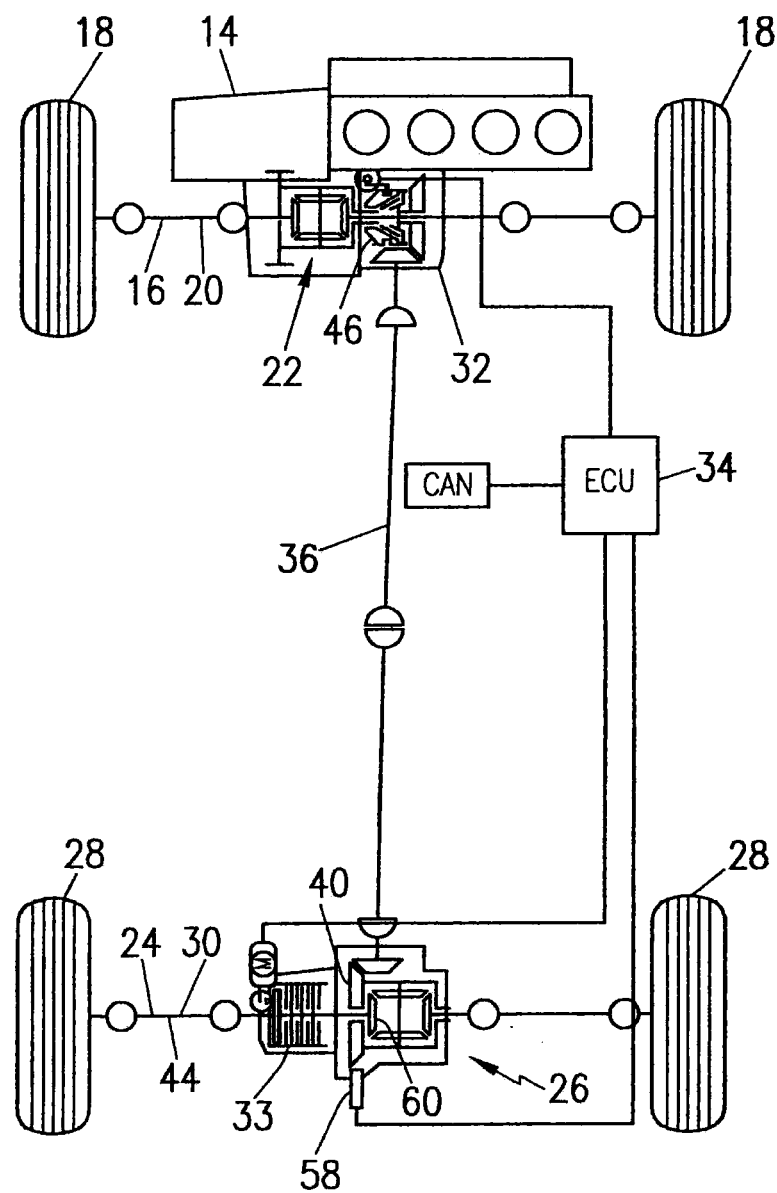
FIG. 13 is a schematic representation of a seventh embodiment of a powertrain in accordance with the invention.
Figure 14A:
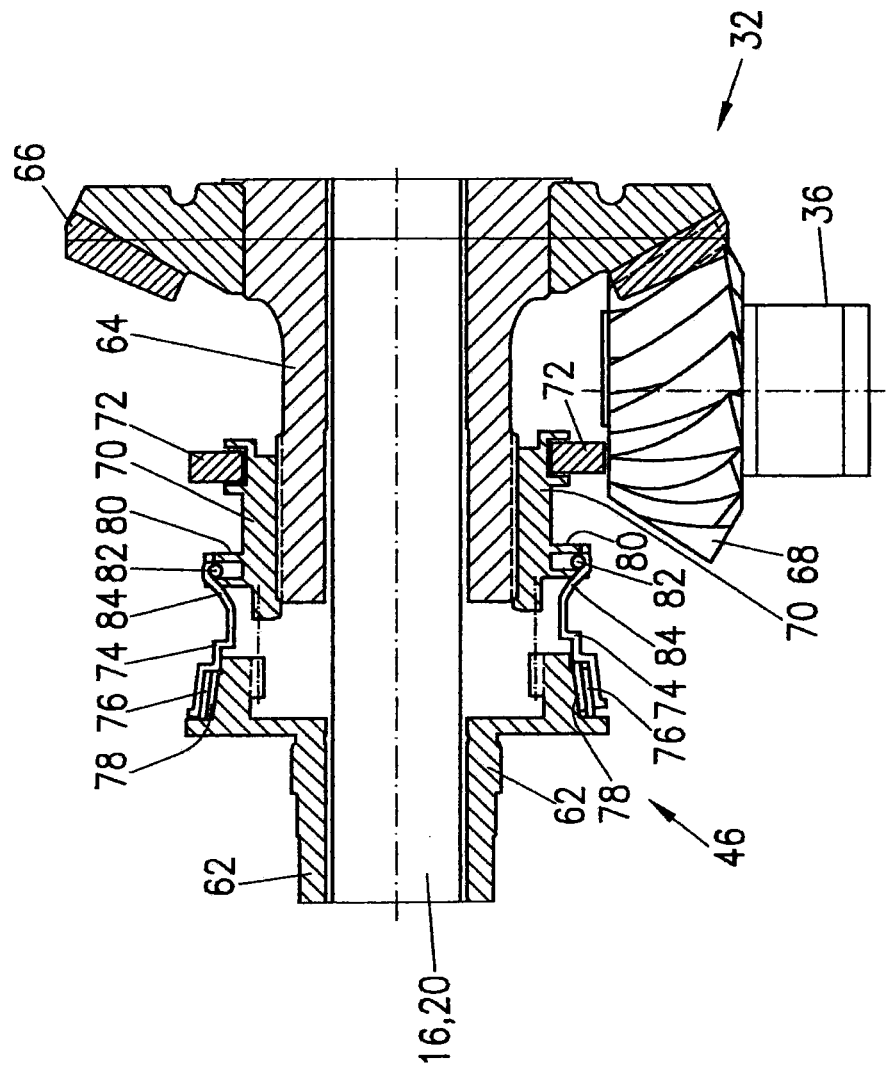
Figure 14B:
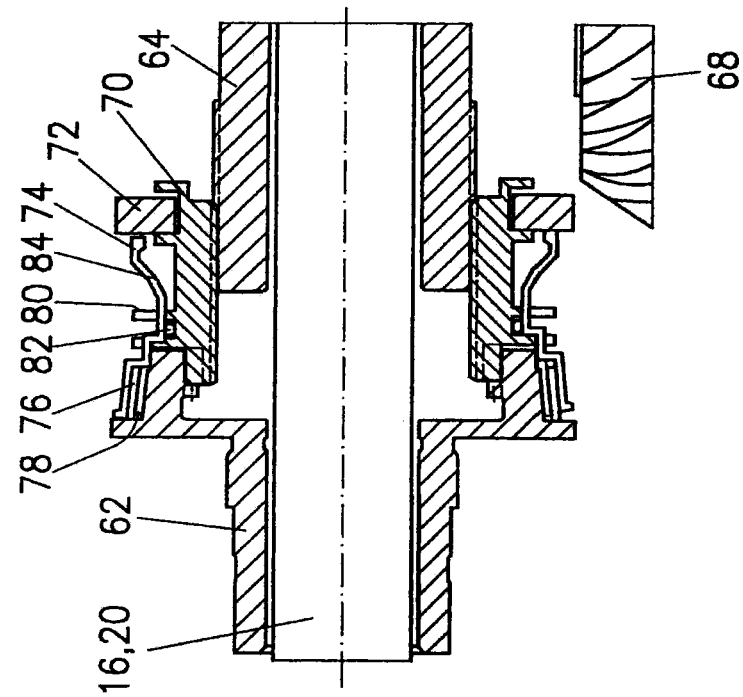
Figure 14C:
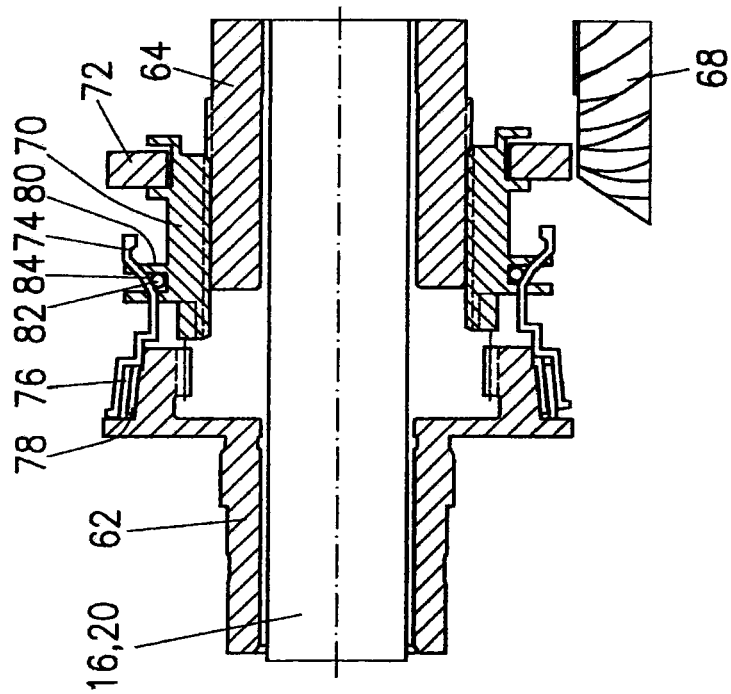
Figure 15:
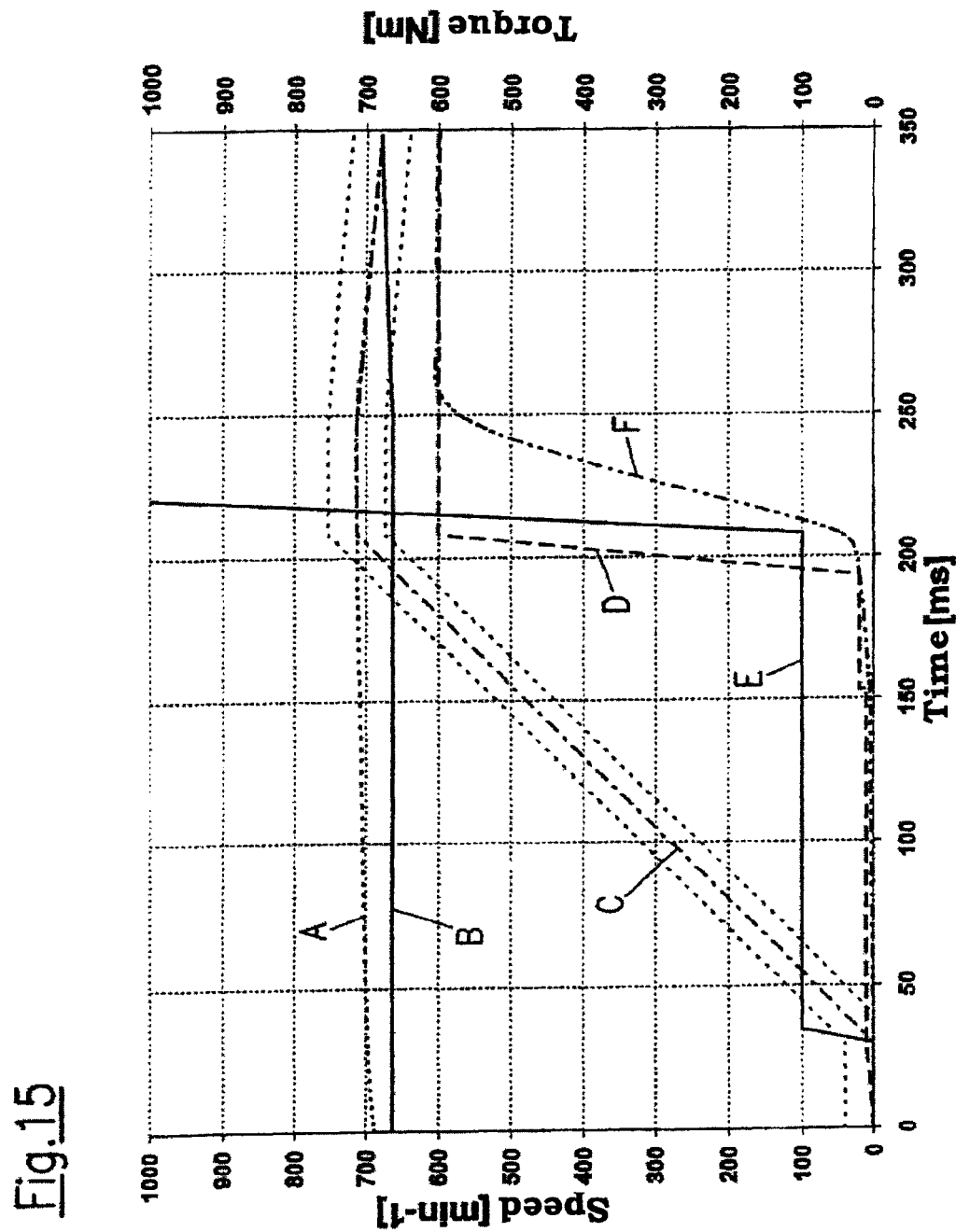

FIGS. 14A through 14C are cross-sectional views of a dog clutch with synchronization apparatus used in the powertrain of FIG. 13: and FIG. 15 is a graphic in which the speeds of a primary axle, of a secondary axle, of a torque transfer section leading from the primary axle to the secondary axle and the course of the torque transferred to the secondary axle during the engagement of the secondary axle from a deactuated state of the torque transfer section in the powertrain from FIG. 13 are shown.

Corresponding reference numerals indicate corresponding parts throughout the several views of the drawings.

DETAILED DESCRIPTION

Example embodiments will now be described more fully with reference to the accompanying drawings.

Figure 1:
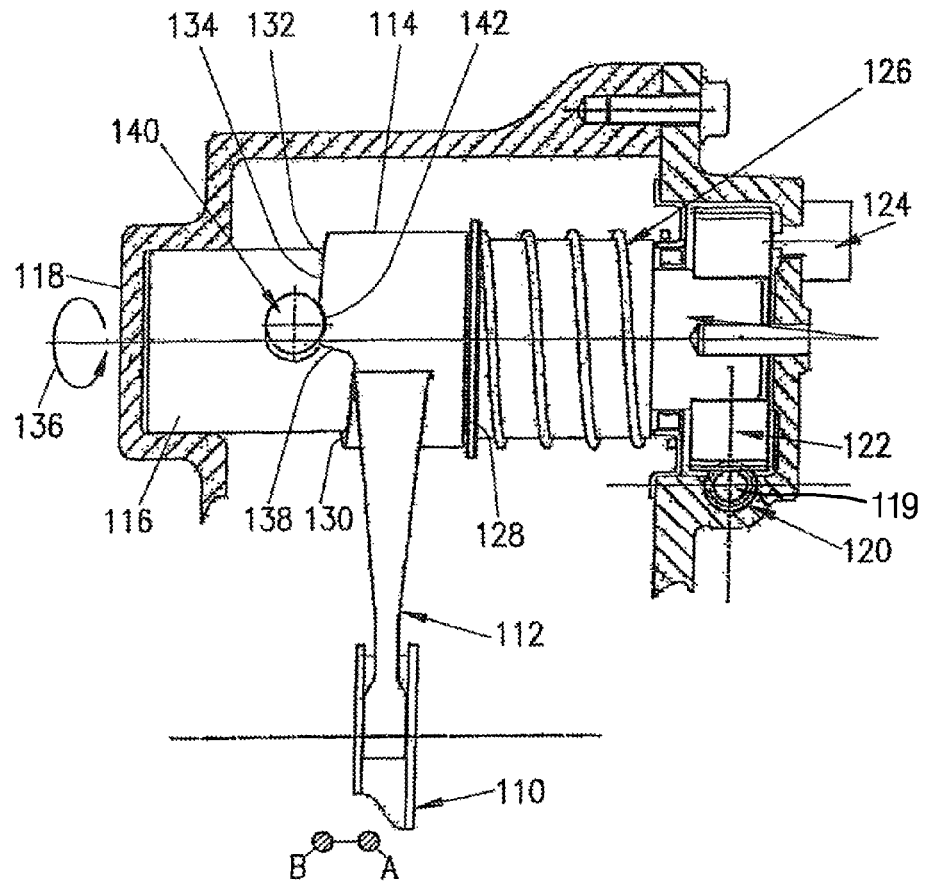
FIG. 1 is a side view of a first embodiment of an actuating apparatus of a clutch in accordance with the invention with a cut-away housing.

A first embodiment of an actuating apparatus of a clutch in accordance with the invention is shown in FIG. 1 which includes two clutch parts which are not shown and which can be brought into engagement in form fitting manner to close the clutch or can be brought out of engagement to open the clutch. The clutch can, for example, be a dog clutch. Furthermore, the clutch can include a synchronization device in particular integrated into the clutch.

The actuation of the clutch parts takes place in a manner known per se by means of a selector sleeve 110 which is displaceable between an opened position A (at the right in FIG. 1) and a closed position B (at the left in FIG. 1).

A shift fork 112 which is fixedly connected to the shift member 114 is provided for the displacement of the selector sleeve 110. The shift member 114 is made in sleeve form or in ring form and is supported displaceably on an actuating shaft 116. The actuating shaft 116 is rotatably supported in a housing 118. To rotate the actuating shaft 116, an electric motor is provided having a motor shaft 119 which drives a worm 120 which is in engagement with a worm wheel 122 which is seated on the actuating shaft 116 and which is rotationally fixedly connected to it. A positional sensor 124 is provided to determine the rotational position of the actuating shaft 116.

A helical compression spring 126 which surrounds the actuating shaft 116 is arranged between a first end face side 128 of the shift member 114 and the housing 118 and is made such that it compresses and exerts a restoring force on the shift member 114 when it is in the opened position A.

A shift ramp 132 is formed at a second end face side 130 of the shift member 114 remote from the helical compression spring 126. The actuating ramp 132 includes a longer first ramp section 134 which rises slowly viewed in the direction of rotation 136 of the actuating shaft 116 and is therefore also called a flat ramp section and a shorter second ramp section 138 which falls steeply starting from the first ramp section and is therefore also called a steep ramp section. The steep ramp section 138 defines both the start and the end of the actuating ramp 132.

The shift member 114 is pressed by the helical compression spring 126—to the left in FIG. 1—against an actuating pin 140 which is inserted into the actuating shaft 116 and projects at least so far out when viewed in the radial direction that it can be in engagement with the shift member 114.

A rotation of the actuating shaft 116 in the direction of rotation 136 has the effect that the actuating pin 140 slides up the flat ramp section 134 along the actuating ramp 132, whereby the shift member 114 is displaced against the restoring force of the helical compression spring 126 in the direction of its opened position A—that is to the right in FIG. 1. As soon as the actuating pin 140 has reached the end region of the actuating ramp 132, that is, so-to-say, the highest point of the actuating ramp 132, the shift member 114 is in its opened position A and the clutch parts are completely disengaged.

To secure the actuating pin 114 in this position, a latch recess 142 is provided in the region of the end of the flat ramp section 134 into which the actuating pin 140 can latch, as is shown in FIG. 1. The reaching of the end of the flat ramp section 134 or of the opened position A is detected by the positional sensor 124.

If a fast closing of the clutch is desired, the actuating shaft 116 is rotated further by a few degrees in the direction of rotation 136, whereby the actuating pin 140 is moved beyond the end of the actuating ramp 132. Driven by the tensioned helical compression spring 126, the shift member 114 hereby abruptly moves to the left into the closed position B, whereby the clutch parts are brought into engagement within a very short time.

If a "tooth-on-tooth" position should initially result on the engagement of the clutch parts, the helical compression spring 126 exerts its restoring force onto the shift member 114 for so long until the clutch parts are correctly engaged. The helical compression spring 126 in other words therefore forms an energy store up to the complete closing of the clutch.

For the opening and fast closing of the clutch, the actuating shaft 116 always, as described above, only has to be rotated in one direction, namely in the direction of rotation 136. It is, however, also generally possible to reverse the direction of rotation of the electric motor and thus of the actuating shaft 116 to allow the actuating pin 140 to slide down the actuating ramp 132 from the end position shown in FIG. 1. The shift member 114 is hereby slowly pressed out of the opened position A by the helical compression spring 162 into the closed position B and the clutch is slowly closed.

In the closed position B, the shift member 114 is supported at the actuating pin 140 in the starting region of the actuating ramp 132. Alternatively or additionally, another component can also be provided for the support of the shift member 140. To minimize jolts, a damping element can additionally be provided for the support of the shift member 114 in the closed position B.

Figure 2A:
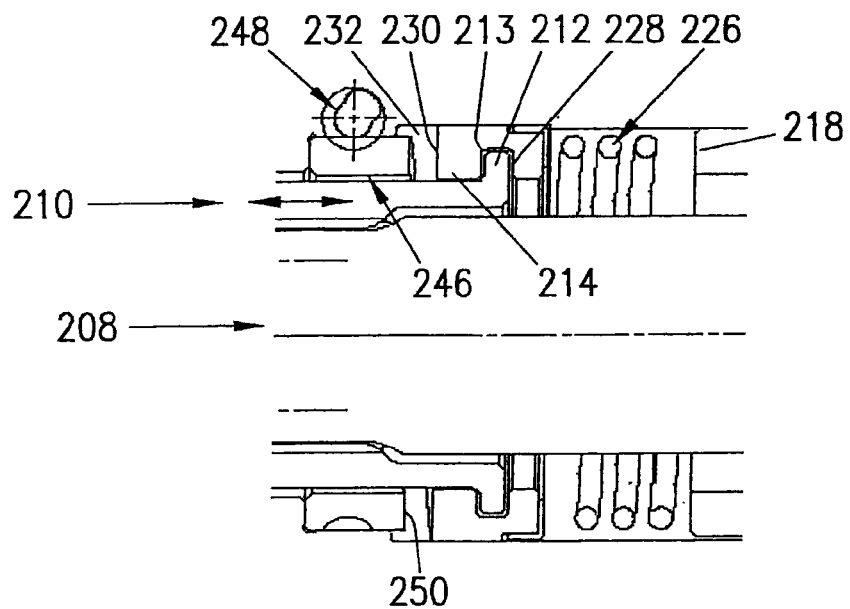
FIG. 2A is a longitudinal section of a second embodiment of an actuating apparatus of a clutch in accordance with the invention.

In FIG. 2A, a second embodiment of an actuating apparatus of a clutch in accordance with the invention is shown which is arranged coaxially around the line-conducting parts from which in FIG. 2A a split shaft 208, e.g. a secondary axle of a motor vehicle, is shown.

The actuating apparatus includes a selector sleeve 210 which surrounds the split shaft 208 and which can be displaced with respect to the split shaft 208 out of an opened position into a closed position. In the region of its end at the right in FIG. 2A, the selector sleeve 210 is bent over radially outwardly. The radially outwardly bent over end section 212 of the selector sleeve 210 engages in a form fitted manner into a ring groove 213 of a ring-shaped shift member 214 which surrounds the selector sleeve 210 at least partly viewed in the axial direction.

A helical compression spring 226 is arranged between the shift member 214 and a housing section 218, said helical compression spring surrounding the split shaft 208 and being tensioned when the selector sleeve 210 is in the opened position (at the right in FIG. 2A) and loads a first end face side 228 of the shift member 214 with a restoring force. The shift member 214 is not rotatable relative to the housing section 218.

Figure 2B:
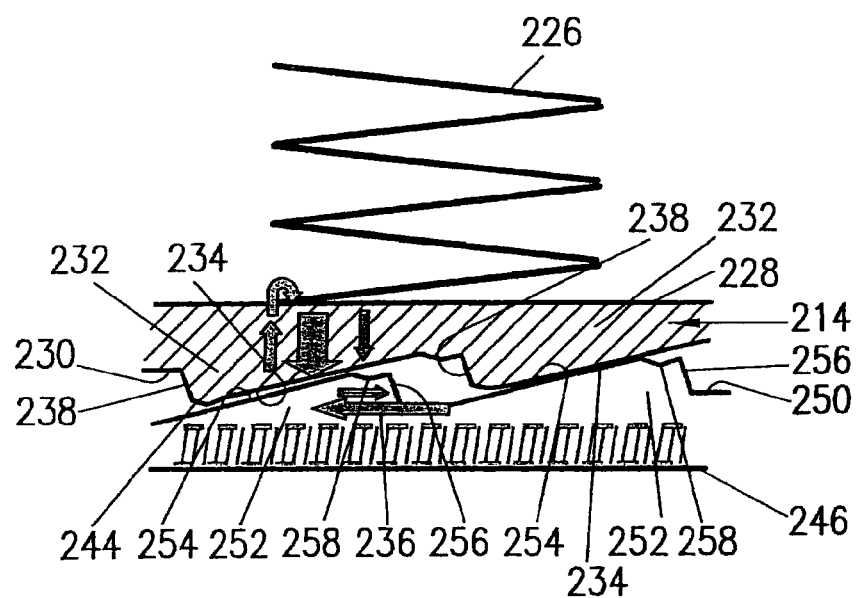
FIG. 2B is a developed representation of a ramp ring mechanism of the actuating apparatus of FIG. 2A.

At a second end face side 230 of the shift member 214 remote from the first end face side 228, a plurality of actuating ramps 232 are formed which extend in the peripheral direction and which each have a first ramp section 234 rising in a flat manner viewed in the direction of rotation 236 and a second ramp section 238 adjoining it and falling steeply (FIG. 2B). In the region of the higher end of each actuating ramp 232, an elevated latch portion 244 is formed at the first ramp section 234 rising in a flat manner.

To bring the selector sleeve 210 into its opened position, the shift member 214 must be displaced axially against the restoring force of the helical compression spring 226, that is to the right in FIG. 2A.

For this purpose, a worm wheel 246 is provided which surrounds the selector sleeve 210. The worm wheel 246 has at its peripheral surface a toothed arrangement which is in engagement with a worm 248 which is driven by an electric motor not shown in FIG. 2A. The electric motor, the worm 248 and the worm wheel 246 are arranged in a fixed position viewed in the axial direction. The selector sleeve 210 is movably supported in the worm wheel 246 relative to it so that the shift member 210 can be displaced in the axial direction.

At an end face side 250 of the worm wheel 246 facing the shift member 240, a plurality of counter-ramps 252 are formed, with the number of counter-ramps 252 coinciding with the number of actuating ramps 232 of the shift member 214 (FIG. 2B). The counter-ramps 252 of the worm wheel 246 are substantially made like the actuating ramps 232 of the shift member 214, but oriented in the opposite direction. That is, a first ramp section 254 of the counter-ramps 252 rises in a flat manner against the direction of rotation 236, whereas a second ramp section 256 falls steeply against the direction of rotation 236.

Each first ramp section 254 rising in a flat manner has in the region of its higher end a latch recess 258 which is made such that it can receive an elevated latch portion 244 of the shift member 214.

The shift member 214 is pressed toward the worm wheel 246, to the left in FIG. 2A, by the helical compression spring 226. In this respect, the actuating ramps 232 of the shift member 214 are in mutual engagement with the counter-ramps 252 of the worm wheel 246, as is shown in FIG. 2B.

To displace the shift member 214 and thus the selector sleeve 210 toward the opening of the clutch against the restoring force of the helical compression spring 226 (to the right in FIG. 2A), the worm wheel 246 is rotated via the worm 248 in the direction of rotation 236 by the electric motor so that the counter-ramps 252 of the worm wheel 246 slide up the actuating ramps 232 of the shift member 214. When the higher end regions of the counter-ramps 252 and of the actuating ramps 232 are oppositely disposed, the shift member 214 is maximally displaced against the helical compression spring 226 and the clutch is opened.

For the detection of a corresponding rotary position of the worm wheel 246, a positional sensor is provided which delivers a corresponding position signal to the electric motor so that the electric motor can be stopped to hold the clutch in the opened state. To secure the worm wheel 246 additionally in this position, the elevated latch portions 244 of the shift member 214 engage into the latch recesses 258 of the worm wheel 246.

If a fast closing of the clutch is desired, the worm wheel 246 only has to be rotated further by a few degrees in the direction of rotation 236 so that the elevated latch portions 244 are released from the latch recesses 258 and the shift member 214 is moved abruptly toward the worm wheel 246 by the helical compression spring 226, that is to the left in FIG. 2A, whereas the steep ramp sections 238 of the actuating ramps 232 slide along the steep ramp sections 256 of the counter-ramps 252 of the worm wheel 246.

In a similar manner as in the first embodiment described above, a slow closing of the clutch is also possible in this second embodiment in that the direction of rotation of the worm wheel 246 is reversed and the worm wheel 246 is rotated against the direction of rotation 236 from a position in which the shift member 214 is maximally displaced with respect to the helical compression spring 226 so that the flat ramp sections 254 of the counter-ramps 252 slide down the flat ramp sections 238 of the actuating ramps 232.

The worm wheel 246 forms an abutment for the shift member 214 with a closed clutch, i.e. when the shift member 214 and the selector sleeve 210 are displaced maximally to the left in FIG. 2A. Additionally or alternatively, a separate abutment or a damper can be provided to avoid or damp a striking of the shift member 214 onto the worm wheel 246 on the closing of the clutch.

Figure 2C:
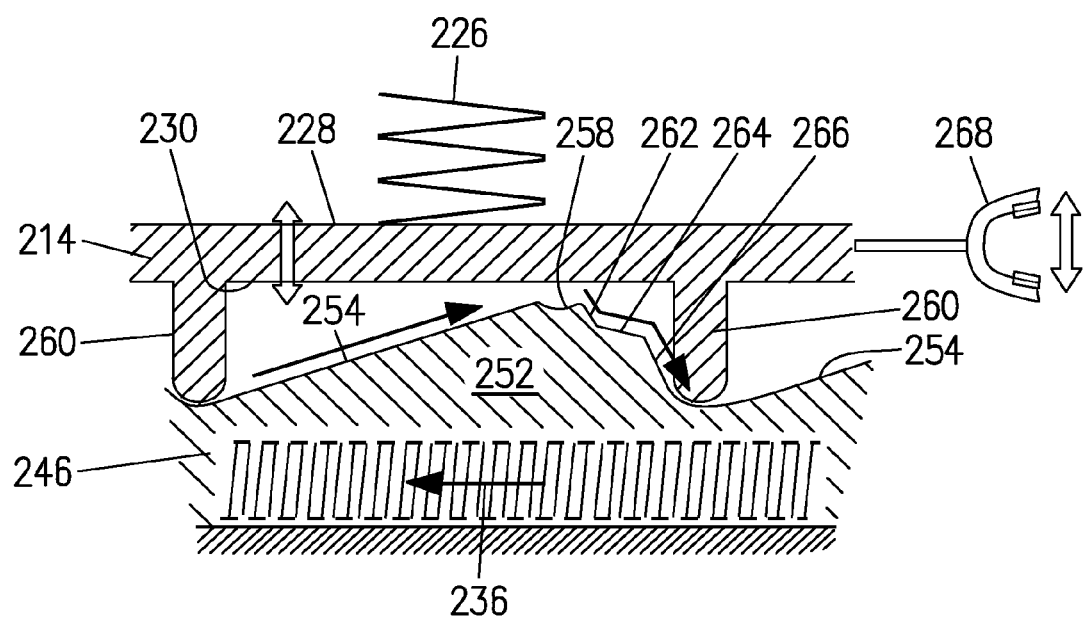
FIG. 2C is a developed representation of an alternative ramp ring mechanism.

In FIG. 2C, an alternative embodiment of a ramp ring mechanism for the actuating apparatus of FIG. 2A is shown which differs from the ramp ring mechanism shown in FIG. 2B in that the shift member 214 does not have any ramps, but rather a plurality of elongate actuating projections 260 which extend axially in the direction of the worm wheel 246 and whose free ends are in contact with it. The actuating projections 260 are arranged equally distributed in the peripheral direction, with the spacing between two adjacent actuating projections 260 being matched to the length of the counter ramp 252 of the worm wheel 246 viewed in the peripheral direction.

The counter-ramps 252 of the worm wheel 246 of FIG. 2C furthermore differ from the counter-ramps 252 of the worm wheel 246 of FIG. 2B in that their second ramp section 256 is made respectively in step shape. More precisely, each of the second ramp sections 256 is respectively composed of three regions 262, 264, 266 of different gradients, namely starting from the latch recess 258 viewed against the direction of rotation 236 of a steeper first region 262, a flatter second region 264 and a steeper third region 266.

With an opened clutch, the actuating projections 260 of the shift member 214 are seated in the latch recesses 258 of the counter-ramps 252 of the worm wheel 246.

If the worm wheel 246 is rotated in the direction of rotation 236 for the closing of the clutch, the shift member 214 is moved abruptly by the helical compression spring 226 into an intermediate position, whereas the actuating projections 260 each move down the steeper first region 262 of the associated counter-ramp 252 and impact the flatter second region 264.

On a further rotation of the worm wheel 246, the shift member 214 remains in its intermediate position for so long until the actuating projections 260 leave the flatter second region 264 and move down the steeper third region 266, whereby the clutch is abruptly completely closed.

The variant of the ramp ring mechanism shown in FIG. 2C is in particular suitable for the engagement of a dog clutch with an integrated synchronization apparatus such as is explained more precisely in the following in connection with FIGS. 13 and 14.

When used with such a clutch, a shift fork connected to the shift member 214 is provided for the displacement of a clutch ring 70 of the clutch and the intermediate position of the shift member 214 corresponds to a synchronization position of the clutch ring 70 (FIG. 14B) in which a synchronization of the speed of a first clutch part 62 with the speed of a second clutch part 64 takes place.

In this respect, the length of the flatter second regions 264 of the counter-ramps 252 of the worm wheel 246 is advantageously selected such that the actuating projections 260 are held in an intermediate position on a constant rotational speed of the worm wheel 246 for a time period which is sufficient to establish a speed similarity or synchronization between the clutch parts 62, 64 so much that the clutch can be closed without it being perceived e.g. by a vehicle occupant.

In FIG. 2D, a further alternative embodiment of a ramp ring mechanism for the actuating apparatus of FIG. 2A is shown which only differs from the ramp ring mechanism shown in FIG. 2C in that the first ramp section 254 is not made rising in a linear manner, but rather has a non-linear gradient course. In more precise terms, the first ramp section 254 is configured steeper in its starting region (at the left in FIG. 2D) than in its end region (at the right in FIG. 2D). The gradient therefore decreases in the direction of the highest point of the counter-ramp 252.

Figure 3:
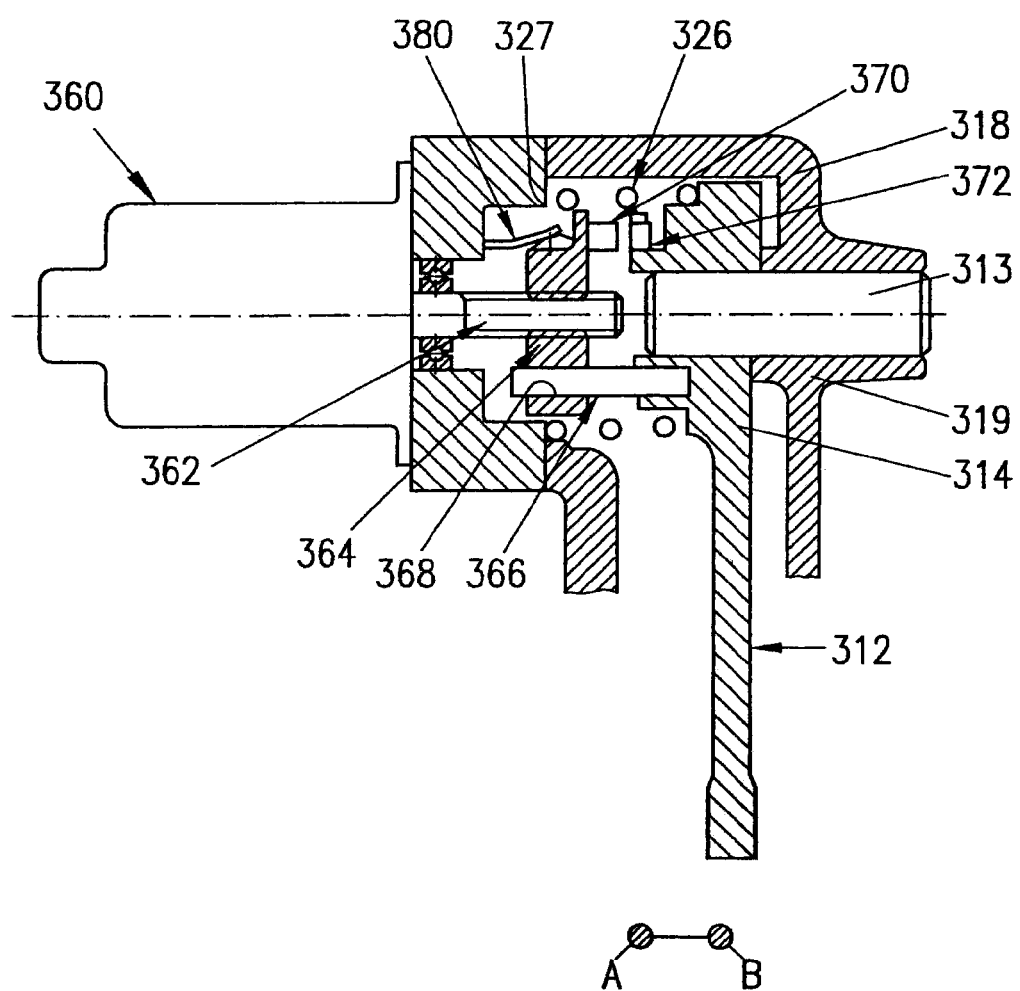
FIG. 3 is a longitudinal sectional view of a third embodiment of an actuating apparatus of a clutch in accordance with the invention.
Figure 4:
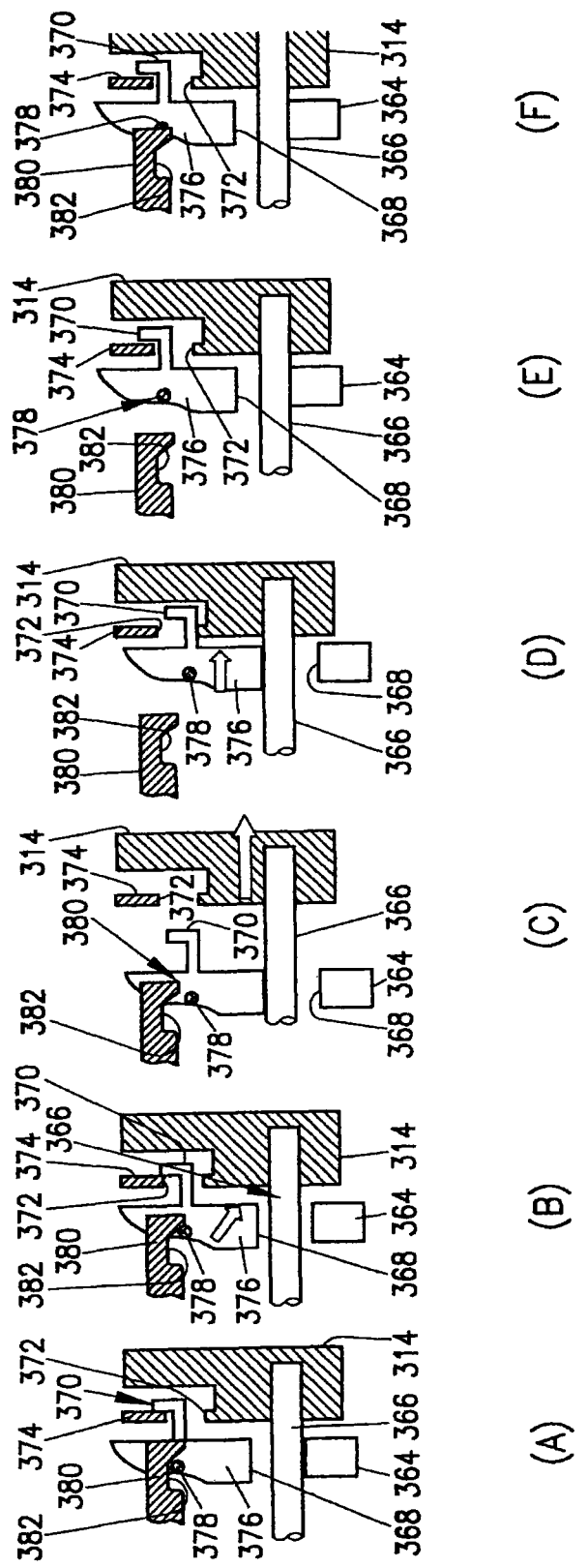
FIGS. 4A through 4F illustrate enlarged details of the actuating apparatus of FIG. 3 in different opened and closed states of the clutch.

In FIGS. 3 and 4, a third embodiment of an actuating apparatus of a clutch arrangement in accordance with the invention is shown. The actuating apparatus includes a shift member 314 which is coupled via a shift fork 312 to a selector sleeve, not shown, which is accommodated in a housing 318 and is displaceably supported on a shaft section 313 which is held by a first wall section 319 of the housing 318 and projects into the interior of the housing 318.

A helical compression spring 326 is arranged between the shift member 314 and a second wall section 327 disposed opposite the first wall section 319 such that the shift member 314 and thus the shift fork 312 as well as the selector sleeve connected thereto is urged to the right in FIG. 3 toward the first wall section 319 into a closed position B in which the clutch is closed.

To move the shift fork 312 into its opened position A, i.e. that is to the left in FIG. 3, to open the clutch against the restoring force of the helical compression spring 326, a return mechanism is provided which includes an electric motor 360, a spindle 362 which is driven by the electric motor 360 and extends coaxially to the shaft section 313 into the interior of the housing 318, and a spindle nut 364 seated on the spindle 362.

A guide bar 366 is fixedly admitted into the shift member 314 and extends offset in parallel relative to the center axis of the shaft section 313 and of the spindle 362 in the direction of the spindle nut 364. A guidance opening 368 is formed in the spindle nut 364 and the guide bar 366 extends through it. The guidance opening 368 is an elongate hole which extends in the peripheral direction and which allows a rotation of the spindle nut 364 about its center axis by a few degrees relative to the guide bar 366. The rotation of the spindle nut 364 is bounded by the abutment of the guide bar 366 at the ends of the guidance opening 368 so that the guide bar 366 and the guidance opening 368 form a rotational limitation device for the spindle nut 364.

To return the shift member 314 from its closed position B shown in FIG. 3 back into the opened position A, the spindle 362 is driven by the electric motor 360 in a first direction of rotation such that the spindle nut 364 moves toward the shift member 314, that is to the right in FIG. 3, under the effect of the rotational limitation device.

As soon as the spindle nut 364 abuts the shift member 314 or is prevented from a further movement toward the shift member 314 by a suitable abutment, an increased power consumption is detected at the electric motor 360, which is an indication for the fact that the spindle nut 364 is in a first end position.

In the first end position, a driver finger 370 of the spindle nut 364 facing the shift member 314 projects into a driver opening 372 correspondingly formed at the shift member 314 (FIG. 4D).

On detection of the first end position, the direction of rotation of the electric motor 360 is reversed into a second direction of rotation, whereby the spindle nut 364 is rotated due to a certain friction in the spindle thread by a few degrees so far about its center axis as the rotational limitation device allows. The rotation of the spindle nut 364 has the effect that the drive finger 370 of the spindle nut 364 engages behind a driver projection 374 of the shift member 314 (FIGS. 4E and 4F).

Since a further rotation of the spindle nut 364 is prevented by the rotational limitation device, the further drive of the spindle 362 in the second direction of rotation has the result that the spindle nut 364 now moves in the axial direction toward the second wall section 327 of the housing 318, that is to the left in FIG. 3, with the spindle nut 364 drawing along the shift member 314 via the driver finger 370 and the driver projection 374 against the restoring force of the helical compression spring 326 and thus bringing the shift fork 312 into its opened position A, that is therefore opens the clutch.

In the opened position A of the shift fork 312, the spindle nut 364 abuts a suitable abutment which defines a second end position of the spindle nut 364 which is in turned detectable by an increased current consumption of the electric motor 360 (FIG. 4A).

If the clutch should be closed again, only the driver finger 370 of the spindle nut 364 and the driver projection 374 of the shift member 314 have to be brought out of engagement so that the shift member 314 can be pressed by the restoration force of the helical compression spring 326 into the closed position B.

The bringing out of engagement of the driver finger 370 and the driver projection 374 takes place by a repeated reversal of the direction of rotation of the electric motor 360 in the first direction of rotation. It must be taken into account here that the driver finger 370 and the driver projection 374 are pressed toward one another by the restoring force of the compressed helical compression spring 326.

If the driver finger 370 and the driver projection 374 were to remain in engagement due to friction forces, the spindle nut 364 would move in accordance with the speed of rotation of the spindle 362 together with the shift member 314 into the closed position B, which would have the consequence of a slow closing of the clutch.

To prevent this, a trigger mechanism is provided which ensures that the driver finger 370 and the driver projection 374 move out of engagement before the spindle nut 364 can move in the direction of its first end position, that is to the right in FIGS. 3 and 4.

The trigger mechanism includes a trigger pin 378 which projects radially from a peripheral surface 376 of the spindle nut 364 as well as a trigger arm 380 which is attached to the second wall section 327 of the housing 318. In the region of an end of the trigger arm 380 facing the spindle nut 364, a recess 382 is formed into which the trigger pin 378 engages when the spindle nut 364 is in its second end position.

The recess 382 is made such that it permits a rotation of the spindle nut 364 on a drive of the spindle 362 in the first direction of rotation (FIGS. 4A and 4B), but at the same time prevents a substantial axial movement of the spindle nut 364 to the right for so long until the driver finger 370 has released from the driver projection 374. In this respect, the driver finger 370 and the driver projection 374, on the one hand, and the trigger pin 378 and the trigger arm 380, on the other hand, move out of engagement essentially simultaneously.

As was already mentioned, a further rotation of the spindle nut 364 is prevented by the rotational limitation device (FIG. 4C) so that the spindle nut 364 is now moved to the right again on a further drive of the spindle 362 in the first direction of rotation (FIG. 4D) to return the shift member 314 from its closed position B back into its opened position A to open the clutch.

The trigger mechanism is made such that it is simply moved over on the opening of the clutch, i.e. when the spindle nut 364 is moved from its first end position into its second end position. The trigger pin 378 and/or the trigger arm 380 can be correspondingly chamfered for this purpose.

In the embodiment shown in FIGS. 3 and 4, a fast closing of the clutch is only possible when the spindle nut 364 is in its second end position. Generally, however, such embodiments are also conceivable in which a fast closing of the clutch is possible from different positions of the spindle nut 364 and in particular over the total travel path or stroke of the spindle nut 364. This ultimately only requires a suitable configuration of a trigger mechanism which actuates in dependence on the direction, for example in the form of a freewheel, of a detent or of a pawl mechanism.

As can be seen from the preceding statements, the triggering of the closing movement of the clutch in accordance with the third embodiment takes place, in contrast to the first and second embodiments, by a reversal of the direction of rotation of the electric motor. Furthermore, in the third embodiment, no positional sensors are required to determine the end positions of the spindle nut 364. Instead, the detection of the end positions of the spindle nut 364 here takes place only via the power consumption of the electric motor 360.

The embodiments of a clutch described above are particularly suitable for a fast engagement of a secondary drive axle of a motor vehicle, as will be explained in more detail in the following.

Figure 5:
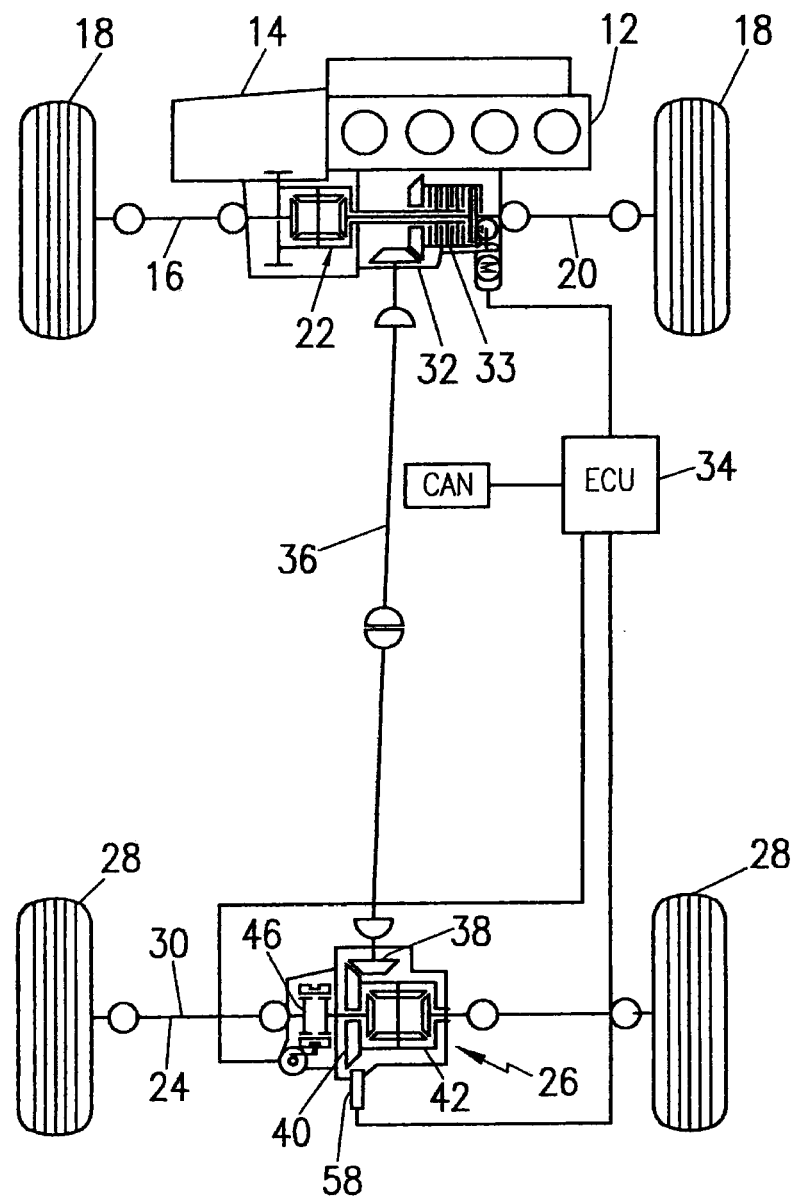
FIG. 5 is a schematic representation of a powertrain in accordance with the invention in accordance with a first embodiment.

In FIG. 5, the powertrain of a motor vehicle is shown in whose front region a drive unit 12 is arranged, in the present example a combustion engine disposed transversely to the longitudinal axis of the motor vehicle. The drive unit 12 is permanently connected via a variable speed gearbox 14 to a front axle 16 of the motor vehicle including a front axle differential 22 so that front wheels 18 seated on the front axle 16 are permanently driven by the drive unit 12 during the drive. The front axle 16 is therefore also called the primary axle 20.

In a rear vehicle region, the motor vehicle has a rear axle 24 having a rear axle differential 26 and rear wheels 28. The rear axle 24 forms a secondary drive axle, also called a secondary axle 30, since it can be driven on demand by the drive unit 12.

For this purpose, a controllable torque diversion device (power lift-off unit) 32 is arranged at the primary axle 20 and an adjustable portion of the drive torque provided by the drive unit 12 can be diverted by it to the secondary axle 30. The torque diversion device 32 includes a multi-disk clutch 33 which is controlled by a control unit 34.

The output of the multi-disk clutch 33 is connected to the one end of a torque transfer section 36, e.g. of a Cardan shaft. At its other end, the torque transfer section 36 is connected to a bevel gear 38 which is in engagement with a crown wheel 40 which is connected to a differential cage 42 of the rear axle differential 26 (FIG. 6).

To prevent the torque transfer section 36 and the differential cage 42 of the rear axle differential 26 from turning unnecessarily and consuming energy during the drive and with an opened multi-disk clutch 33, i.e. on purely front-wheel drive, a device is provided to deactuate the torque transfer section 36 and the differential cage 42.

Figure 6:
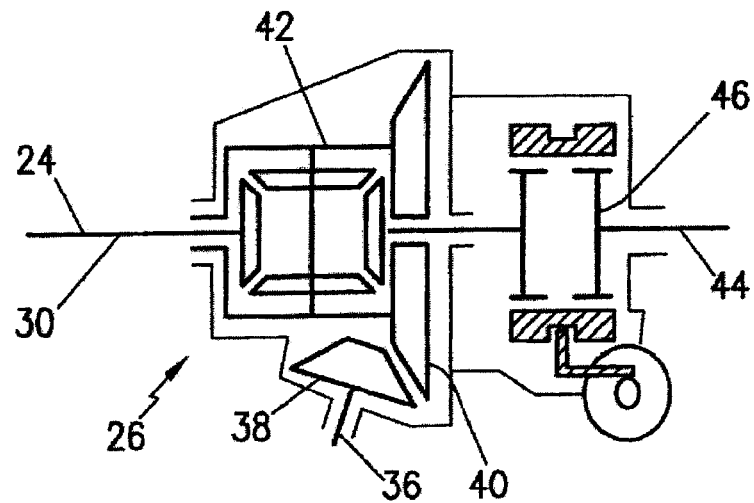
FIG. 6 is a schematic representation of an axle differential with a secondarily connected dog clutch of a secondary axle of the powertrain of FIG. 5.

In the embodiment shown in FIGS. 5 and 6, the deactuation device is formed by a dog clutch 46 which is arranged at a split axle 44 of the rear axle 24 in the proximity of the rear axle differential 26. The dog clutch 46 is a clutch of the type such as was described above in connection with FIGS. 1 to 4.

The dog clutch 46 is likewise controllable by the control unit 34. Alternatively, the dog clutch 46 can also be controlled by a separate control unit separate from the control unit 34 controlling the multi-disk clutch 33 and connected to the control unit 34 e.g. via a CAN bus.

Figure 7:
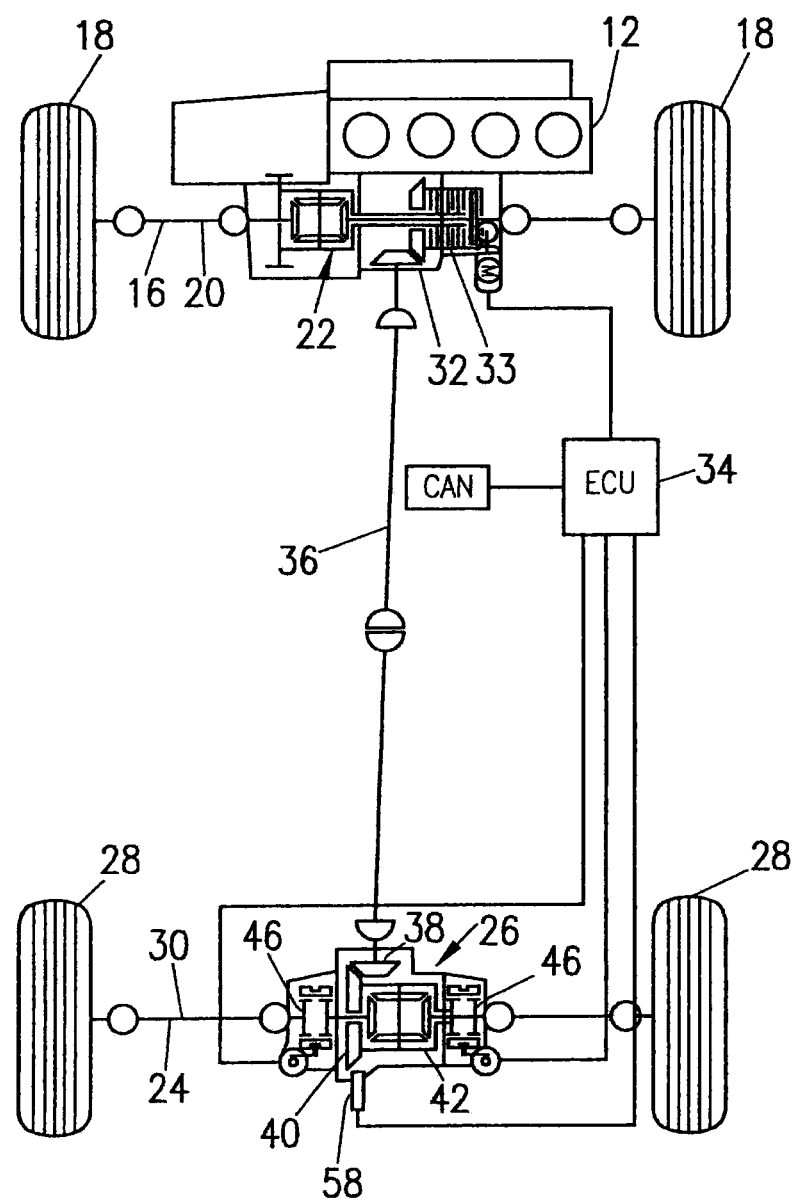
FIG. 7 is a schematic representation of a second embodiment of a powertrain in accordance with the invention.

In FIG. 7, an alternative embodiment of a deactuation device is shown which includes two dog clutches 46 which can be controlled by the control unit 34 and which are arranged in the hubs of the rear wheels 28.

Figure 8:
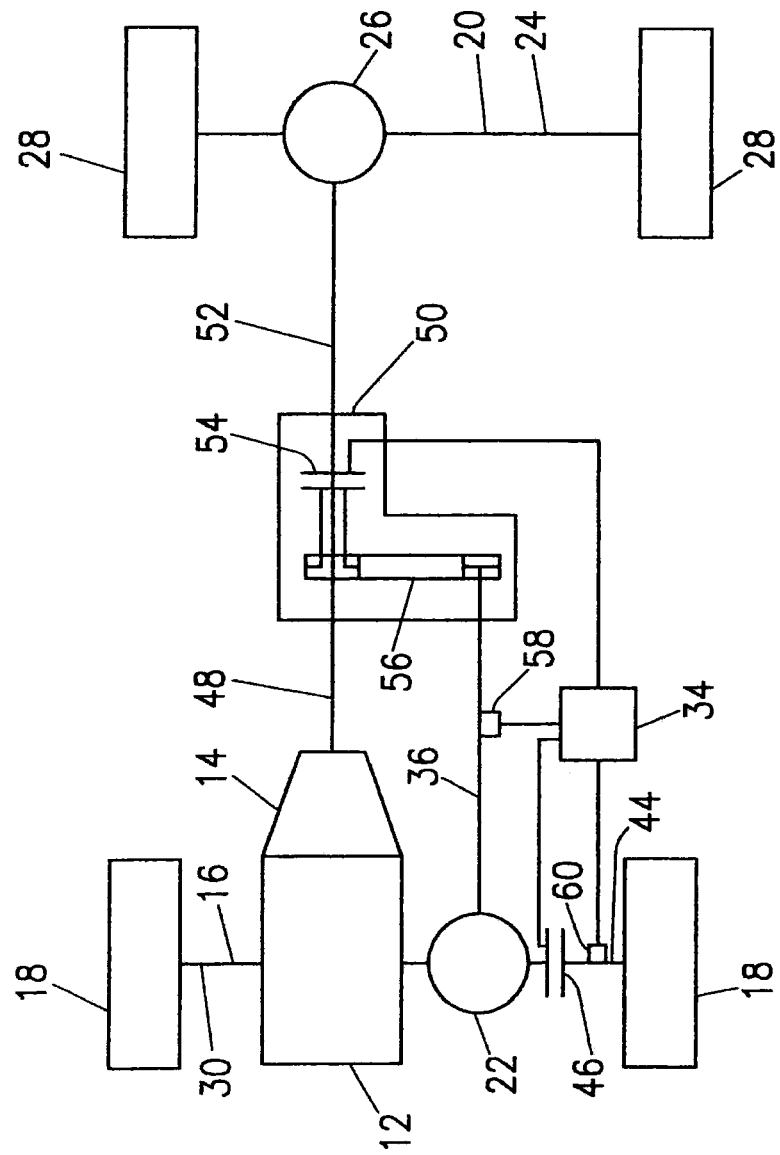
FIG. 8 is a schematic representation of a third embodiment of a powertrain in accordance with the invention.

In FIG. 8, a third embodiment of a powertrain in accordance with the invention is shown. The powertrain includes a drive unit 12, e.g. a combustion engine, arranged in a front region of the motor vehicle. Unlike the embodiments described above, the drive unit 12 of the third embodiment is, however, not aligned transversely to the longitudinal axis of the motor vehicle, but parallel thereto.

The drive unit 12 is connected via a variable speed gearbox 14 to the input shaft 48 of a transfer case 50. A primary output shaft 52 of the transfer case 50 rigidly connected to the input shaft 48 is permanently connected to the rear axle 24 of the motor vehicle via a rear axle differential 26. Unlike in the embodiments described above, in the third embodiment, the rear wheels 28 seated on the rear axle 24 are therefore permanently driven, so that in this case the rear axle 24 is called a primary axle 20.

The transfer case 50 includes in a manner known per se a multi-disk clutch 54 whose input is rotationally fixedly connected to the input shaft 48 of the transfer case 50 and whose output is connected via a chain drive 56 or via gears meshing with one another to the one end of a torque transfer section 36 leading to the front axle differential 22 of the front axle 16. At the other end of the torque transfer section 36—in a similar manner as shown in FIG. 6—a bevel gear is provided which is in engagement with a crown wheel which is fixedly connected to the differential cage of the front axle differential 22.

The multi-disk clutch 54 of the transfer case 50 is connected to a control unit 34. On demand, a portion of the drive torque provided by the drive unit 12 can be transferred by a corresponding control of the multi-disk clutch 54 via the torque transfer section 36 and the front axle 16 to the front wheels 18. In this case, the front axle 16 therefore represents the secondary axle 30.

To prevent that the torque transfer section 36 and the chain drive 56 or the gear drive of the transfer case 50 are driven and move unnecessarily during the drive by the front wheels 18 with an opened multi-disk clutch 54, i.e. with a purely rear wheel drive, a device for the deactuation of the torque transfer section 36 is also provided in the third embodiment shown in FIG. 8.

The deactuation device shown in FIG. 8 is made in a similar manner to the deactuation device shown in FIG. 5 and includes a dog clutch 46 which is controllable by the control unit 34 or by a control unit separate from the control unit 34 and connected to it e.g. via a CAN bus and which is arranged in a split axle 44 of the front axle 16 in the region of the front axle differential 22.

An alternative deactuation device can also be conceived in the third embodiment shown in FIG. 8, said alternative deactuation device being able to be formed in a similar manner to the embodiment shown in FIG. 7 by dog clutches accommodated in the hubs of the front wheels 18 and controllable by the control unit 34 or by a separate control unit.

The operation of the three powertrains described above takes place in a mode in which, in addition to a permanent drive of the primary axle 20, on demand, i.e. for example under predetermined driving conditions such as wheel slip at the wheels of the primary axle 20, drive torque of the drive unit 12 is automatically conducted to the secondary axle 30 and is transferred to the wheels of the secondary axle 30 under the control of the control unit 34. In this respect, the drive torque portion transferred to the secondary axle 30 can be set variably via a corresponding engagement of the multi-disk clutch 33 included in the torque diversion device 32 or of the multi-disk clutch 54 of the transfer case 50 and can thus be matched to the driving conditions. Due to the automatic engagement on demand of the secondary axle 30, this drive mode is here called the automatic four-wheel drive mode.

In addition to the automatic four-wheel drive mode, the vehicle can additionally have a permanent two-wheel drive mode in which only the primary axle 20 is driven and/or a permanent four-wheel drive mode in which both the primary axle 20 and the secondary axle 30 are permanently driven, with, in the permanent four-wheel operating mode, either a fixedly preset transfer of the drive torque to the primary axle 20 and to the secondary axle 30 being conceivable or a transfer adapted in a variably adjustable manner to the driving conditions.

A requirement for drive torque to be able to be transferred as immediately as possible to the secondary axle 30 on demand in the automatic four-wheel drive mode is that the or each dog clutch 46 is closed as fast as possible. In particular from the deactuated state of the torque transfer section 36, this requires a synchronization of the movement of the torque transfer section 36 with the movement of the secondary axle 30. The duration of the synchronization in this respect depends on the difference of the speeds of the secondary axle 30 and of the torque transfer section 36, i.e. ultimately, with a completely deactuated torque transfer section 36, on the vehicle speed.

To achieve an engagement of the secondary axle 30 as fast as possible, in accordance with the invention a monitoring of the wheels of the primary axle 20 for wheel slip is provided. For this purpose, the control unit 34 is connected to corresponding wheel slip detectors. The wheel slip detectors can, for example, be speed of rotation sensors, not shown, which monitor the speeds of the wheels of the primary axle 20 and of the secondary axle 30.

As soon as the averaged speed of the wheels of the primary axle 20 (line A in FIG. 9) exceeds the averaged speed of the wheels of the secondary axle 30 (line B in FIG. 9) by a predetermined amount (optionally dependent on the steering angle), the control unit 34 assumes that there is wheel slip at the primary axle 20 and that there is a demand for four-wheel drive.

The control unit 34 therefore instigates the engagement of the secondary axle 30 at a time t=0 in that it first commands the synchronization of the torque transfer section 36 with the secondary axle 30.

The synchronization takes place with the help of the multi-disk clutch 54 of the transfer case 50 or with the help of the multi-disk clutch 33 of the torque diversion device 32 which is engaged in a controlled manner for this purpose. The multi-disk clutch 54 requires approximately 70 milliseconds to 80 milliseconds to run through the release clearance before it starts actually to accelerate the torque transfer section 36 (curve C in FIG. 9).

The acceleration of the torque transfer section 36 can take place in accordance with a fixedly preset speed gradient or in accordance with a speed gradient which is matched to the driving conditions and e.g. can be taken correspondingly from a look-up table.

As FIGS. 5, 7 and 8 show, the control unit 34 is connected to a speed of rotation sensor 58 for the monitoring of the speed of the torque transfer section 36. The speed of rotation sensor 58 allows the control unit 34 to determine the actual acceleration of the torque transfer section 36 and to compare it with a desired acceleration or with a desired speed gradient. Alternatively, the signal of the speed of rotation sensor 58 can be used as an actual value for a speed regulation, i.e. the multi-disk clutch 54 is actuated by means of a speed controller such that the named actual value of the speed is approximated to a desired value.

The control unit 54 can have a learning routine which allows it to adapt an originally preset synchronization torque and thereby to compensate tolerances and temperature effects as well as changes over the service life which can impair the accuracy of the multi-disk clutch.

Furthermore, the learning routine can be used to calibrate and/or check the system with a disengaged dog clutch 46. The low torque range and the accuracy of the multi-disk clutch in the low torque range can in particular be verified and/or checked and/or other diagnostics can be carried out. For example, the look-up table in which the transferred torque over the state of engagement of the multi-disk clutch is stored can be adapted correspondingly when the acceleration of the torque transfer section 36 is faster or slower than expected.

After approximately 230 milliseconds, the movement of the torque transfer section 36 is synchronized with the movement of the secondary axle 30, i.e. the speed of the torque transfer section 36 approximately corresponds to the speed of the secondary axle 30 so that the or each dog clutch 46 can be engaged. A speed of rotation sensor (not shown) connected to the control unit 34 is provided to determine the speed of the secondary axle 30.

Figure 9:
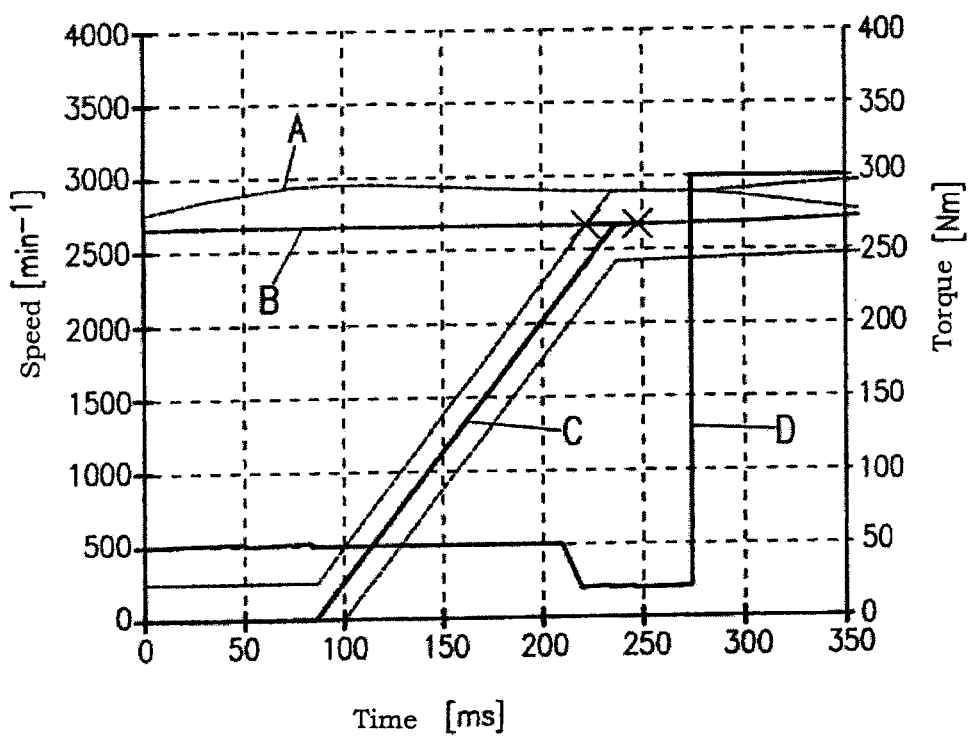
FIG. 9 is a graphic in which the speeds of a primary axle, of a secondary axle, of a torque transfer section leading from the primary axle to the secondary axle and the course of the torque transferred to the secondary axle during the engagement of the secondary axle from a deactuated state of the secondary axle are shown.

Usually, the closing of the dog clutch(es) 46 does not require any exact coincidence of the speeds of the torque transfer section 36 and of the secondary axle 30, but rather the engagement can take place within a speed difference range which corresponds to a time period marked by the crosses "X" in FIG. 9.

While taking account of the fact that the engagement of the dog clutch 46 takes place with a certain delay, the closing of the dog clutch 46 can already be commanded at a time which is before the time at which the speed of the torque transfer section 36 achieves the speed of the secondary axle 30. The exact time for the activation of the dog clutch 46 can easily be determined from the acceleration of the torque transfer section 36, i.e. from the preset desired speed gradient or from the actual speed gradient such as is determined by the monitoring of the speed of the torque transfer section 36 with the help of the speed of rotation sensor 58.

In addition, a blocking synchronization apparatus can be provided which prevents a closing of the dog clutch 46 as long as the difference between the speed of the secondary axle 30 and the speed of the torque transfer section 36 is too high. As soon as the speed difference reaches a permitted range, the blocking synchronization apparatus allows an automatic engagement of the dog clutch 46.

To facilitate the closing of the dog clutch 46 and in particular the actuation of a selector sleeve associated with it, the torque provided by the multi-disk clutch 54 (curve D in FIG. 9) during the engagement of the dog clutch 46 is briefly reduced and raised, after the closing of the dog clutch 46, to the value which should ultimately be transferred to the secondary axle 30.

It is possible by the use of the multi-disk clutch 54 for the synchronization of the torque transfer section 36 to synchronize the torque transfer section 36 with the secondary axle 30 within a very short time.

As a result, the measures described above allow an engagement of the secondary axle 30 from a deactuated state of the torque transfer section 36 within a very short time, for example within 200 milliseconds up to 300 milliseconds.

Since the torque for the acceleration of the torque transfer section 36 is diverted from the drive unit 12 and thus from the primary axle 20, the synchronization of the torque transfer section 36 moreover, additionally to a traction control, contributes to reducing the wheel slip at the primary axle 20, whereby the wheel slip at the primary axle 20 can be kept at a low value.

After the engagement of the secondary axle 30 has taken place, the powertrain is operated in four-wheel drive mode by the control unit 34, with a check being made at regular time intervals whether the four-wheel drive mode is still necessary. If this is no longer the case, a switch back to the two-wheel drive is made in that the dog clutch 46 and the multi-disk clutch 33 or 54 respectively are opened again.

In FIGS. 10 to 13, further embodiments of a power train in accordance with the invention are shown in which the torque transfer section 36 can in each case be deactuated or engaged in the manner described above.

Figure 10:
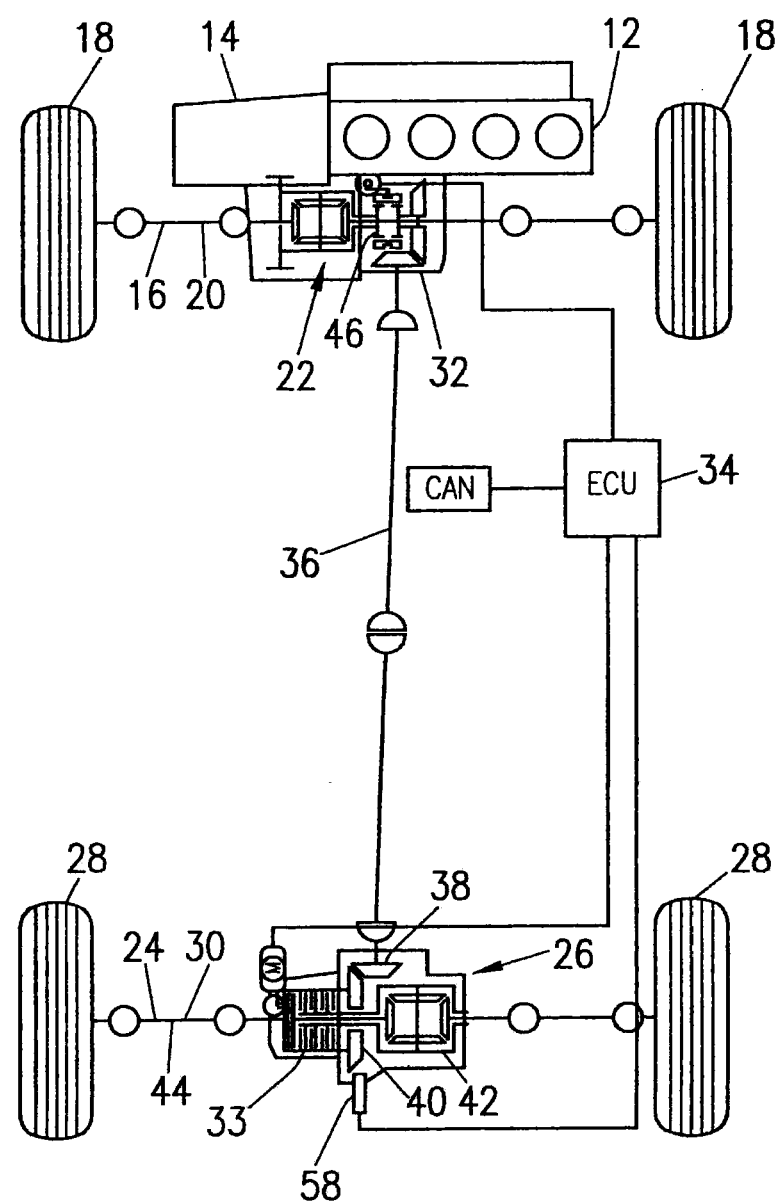
FIG. 10 is a schematic representation of a fourth embodiment of a powertrain in accordance with the invention.

FIG. 10 shows a fourth embodiment which differs from the embodiment shown in FIG. 5 in that the dog clutch 46 is arranged at the primary axle 20, and indeed between the front axle differential 22 and the torque diversion device 32, whereas the multi-disk clutch 33 is located at the secondary axle 30, i.e. that is the rear axle 24. More precisely, the multi-disk clutch is connected between the crown wheel 40 in engagement with the bevel gear 38 of the torque transfer section 36 and the differential cage 42 of the rear axle differential 26. In this embodiment, the engagement of the dog clutch 46 requires a synchronization of the movement of the torque transfer section 36 with the movement of the primary axle 20 which can be achieved, for example, by an at least partial closing of the multi-disk clutch 33 at the secondary axle 30.

Figure 11:
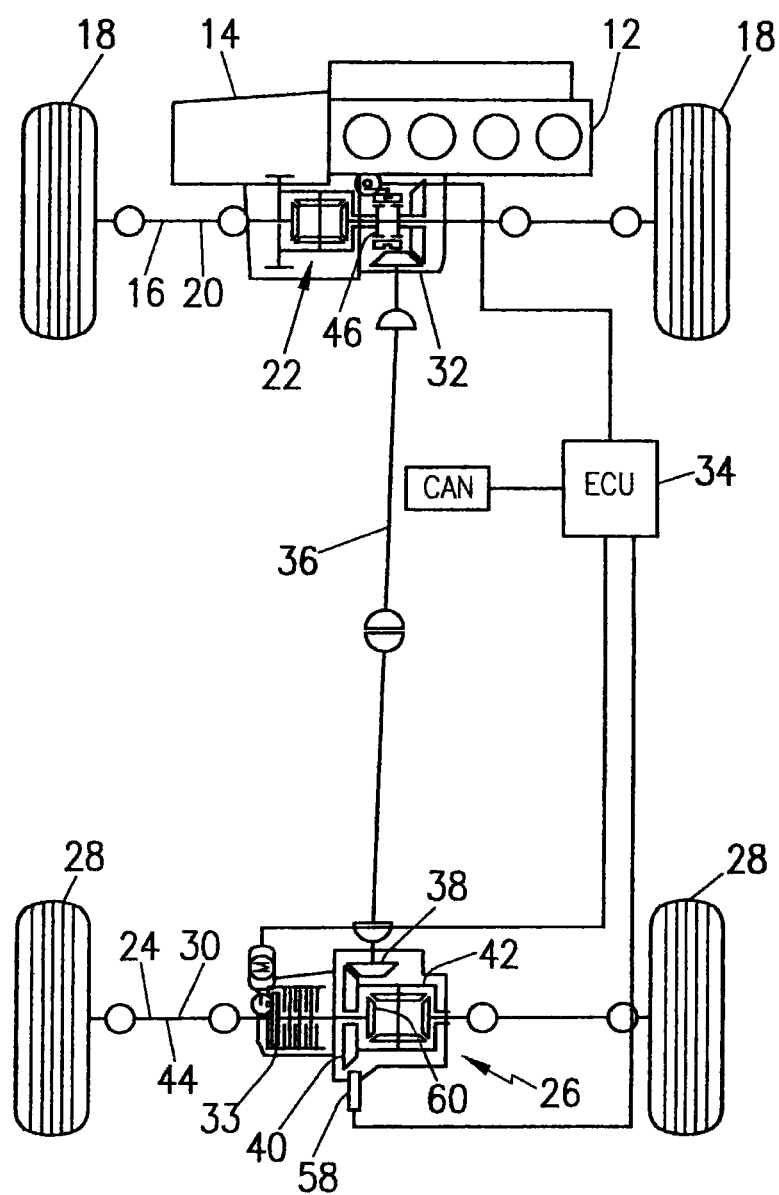
FIG. 11 is a schematic representation of a fifth embodiment of a powertrain in accordance with the invention.

FIG. 11 shows a fifth embodiment which only differs from the fourth embodiment shown in FIG. 10 in that the multi-disk clutch 33 arranged at the rear axle 24 or secondary axle 30 is connected between an side gear 60 of the rear axle differential 26 and a split axle 44 of the rear axle 24.

Figure 12:
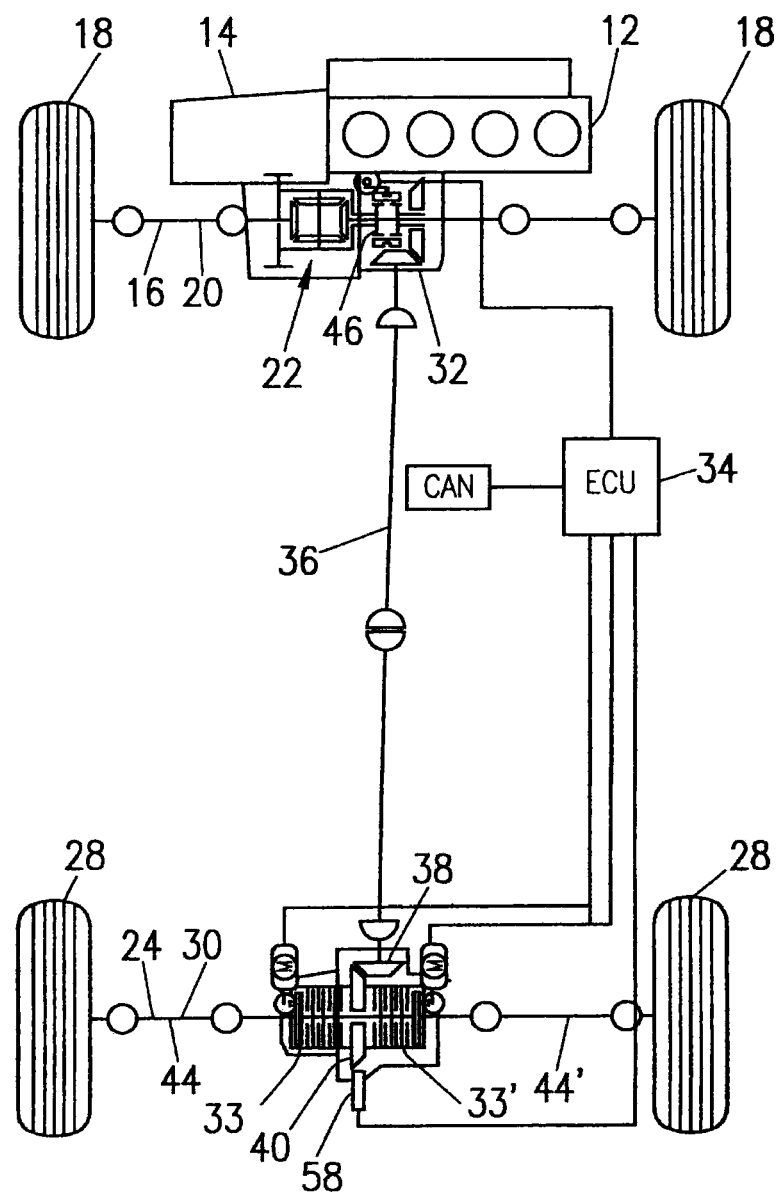
FIG. 12 is a schematic representation of a sixth embodiment of a powertrain in accordance with the invention.

FIG. 12 shows a sixth embodiment which differs from the fourth embodiment shown in FIG. 10 in that no rear axle differential 26 is provided, but rather, in addition to the multi-disk clutch 33 connected between the crown wheel 40 and the one split axle of 44 of the rear axle 24, a further multi-disk clutch 33' is connected between the crown wheel 40 and the other split axle 44'. The rear axle differential 26 is therefore replaced in this embodiment by the combination of the two multi-disk clutches 33, 33', with each of the multi-disk clutches 33, 33' being separately controllable by the control unit 34.

Furthermore, a seventh embodiment is shown in FIG. 13 which only differs from the fifth embodiment shown in FIG. 11 in that the dog clutch 46 is provided with an integrated synchronization device. In this case, the synchronization of the movement of the torque transfer section 36 with the movement of the primary axle 20 can therefore also take place alternatively or additionally to the multi-disk clutch 33 by the synchronization device of the dog clutch 46.

A detailed view of the dog clutch 46 integrated into the torque diversion device 32 of the powertrain in accordance with the seventh embodiment is shown in FIG. 14. The dog clutch 46 includes a first clutch part 62 which is rotationally fixedly connected to the differential cage of the front axle differential 22 and is rotatably journaled with respect to a shown split axle of the front axle 16. A second clutch part 64 of the dog clutch 46 likewise rotatably journaled with respect to the shown split axle of the front axle 16 is rotationally fixedly connected to a crown wheel 66 which is in engagement with a bevel gear 68 of the torque transfer section 36.

The engagement of the dog clutch 46 takes place by means of a clutch ring 70 supported rotationally fixedly and axially displaceably on the second clutch part 64. The clutch ring 70 is axially movable between a first position in which the clutch ring 70 is only in engagement with the second clutch part 64 (FIG. 14A) and a second position in which the clutch ring 70 is in engagement both with the second clutch part 64 and with the first clutch part 62 (FIG. 14C) to transfer torque from the first clutch part 62 to the second clutch part 64.

For the axial displacement of the clutch ring 70, a shift fork 72 is provided which is movable by a motor which is controlled by the control unit 34.

With a deactuated torque transfer section 36, the second clutch part 64 and thus the clutch ring 70 are also stationary. So that the clutch ring 70 can be brought into engagement with the first clutch part 62, a certain speed similarity is required between the clutch ring 70 or the second clutch part 64 and the first clutch part 62. A synchronization apparatus which becomes active as soon as the clutch ring 70 is moved in the direction of the first clutch part 62 is integrated into the clutch 46 for the synchronization of the speed of the clutch ring 70 with the speed of the first clutch part 62.

The synchronization apparatus includes a plurality of synchronization hoops 74 which are arranged around the axle 16 and 20 respectively and which each project over a section of the first clutch part 62 and of the clutch ring 70. The synchronization hoops 74 are rotationally fixedly connected to the clutch ring 70 and consequently rotate at the same speed as the second clutch part 64.

Each synchronization hoop 74 is provided in the region of its end facing the first clutch part 62 with a friction surface 76 at its inner side. Correspondingly, a friction surface 78 is formed at the outside of the section of the first clutch part 62 projected over by the synchronization hoops 74.

The clutch ring 70 has at its outside a guide 80 in which a spring ring 82 is supported and is secured against a displacement in the axial direction. The spring ring 82 presses from the inside against the synchronization hoops 74, i.e. it exerts a force against the synchronization hoops 74 outwardly in the radial direction.

The section 84 of each synchronization hoop 74 projecting over the clutch ring 70 is made in ramp-like manner such that the spring ring 82 is compressed radially inwardly against its restoring force when the clutch ring 70 is moved to the first clutch part 62 to engage the clutch 46.

The force exerted onto the synchronization hoops 74 by the spring ring 82 has the effect that the friction surfaces 76 of the synchronization hoops 74 are pressed toward the friction surfaces 78 of the first clutch part. In this respect, the force with which the friction surfaces 76, 78 are pressed toward one another is the greater the further the spring ring 82 is compressed.

In the disengaged state of the clutch 46 (FIG. 14A), the force exerted by the spring ring 82 onto the synchronization hoops 74 is so small that the friction surfaces are just not in contact, whereas the friction surfaces 76, 78 are, shortly before the clutch ring 70 comes into engagement with the first clutch part 62 (FIG. 14B), compressed toward one another with a force which is sufficient to accelerate the second clutch part 64 to the speed of the first clutch part 62 at a desired acceleration.

As can be seen from FIG. 14, the synchronization apparatus of the clutch 46 is formed without a blocking element. This allows the clutch 46 also to be engaged when no speed identity is established between the first and second clutch parts 62, 64, i.e. even if there is still a certain speed difference between the clutch parts 62, 64.

The engagement of the secondary axle 30 of the powertrain of FIG. 9 will now be explained with reference to FIG. 15 starting from a deactuated torque transfer section 36.

As soon as the averaged speed of the wheels of the primary axle 20 (line A in FIG. 15) exceeds the averaged speed of the wheels of the secondary axle 30 (line B in FIG. 15) by a predetermined amount (optionally dependent on the steering angle), the control unit 34 assumes that there is wheel slip at the primary axle 20 and that there is a demand for four-wheel drive.

The control unit 34 therefore instigates the engagement of the secondary axle 30 at a time t=0 in that it first commands the synchronization of the torque transfer section 36 with the secondary axle 30.

The synchronization takes place with the help of the dog clutch 46 of the torque diversion device 32 in that the clutch ring 70 is displaced in the direction of the first clutch part 62 to press the friction surfaces 76, 78 toward one another in a controlled manner. After approximately 30 ms, a preset synchronization torque is transferred from the first clutch part 62 via the synchronization hoops 74 to the second clutch part 64 (curve E in FIG. 15), whereby the speed of the torque transfer section 36 is increased (curve C in FIG. 15). The preset synchronization torque amounts in the present embodiment to 100 Nm and is maintained for so long until the speed of the torque transfer section 36 has at least approximately reached the speed of the primary axle 20.

As soon as the speed difference between the primary axle 20 and the torque transfer section 36 falls below a preset limit which allows a closing of the dog clutch 46 which is essentially not noticeable for a vehicle occupant, the second clutch part 64 is brought into engagement with the first clutch part 62 by a still further displacement of the clutch ring 70, i.e. the dog clutch 46 is completely engaged. In the present embodiment, this takes place approximately 210 ms after the detection of the wheel slip.

Even before the torque transfer section 36 (curve C in FIG. 1) has reached the speed of the primary axle 20 (curve A in FIG. 15), which is the case at approximately 210 ms in accordance with FIG. 15), it is started to engage the multi-disk clutch 33 (curve D in FIG. 15), at approximately 190 ms in the present embodiment. As long as the speed of the secondary axle 30 (curve B in FIG. 15) is higher than the speed of the torque transfer section 36, the engagement of the multi-disk clutch 33 does not effect any braking of the torque transfer section 36 That is, for the preparation of a fast engagement of the multidisk clutch 33, the release clearance can already be overcome so that the disks of the multi-disk clutch 33 are in minimal contact with one another (so-called "kiss point").

If the torque transfer section 36 reaches the speed of the secondary axle 30, the multi-disk clutch 33 can admittedly counter the further acceleration or synchronization of the torque transfer section 36 by the control of the kiss point. This is, however, accepted in order to achieve a faster engagement of the secondary axle 30 overall. Since the synchronization apparatus of the dog clutch 46—as already mentioned—is made without a blocking device, the dog clutch 46 can namely be connected, i.e. that is closed, despite the speed dissimilarity.

As a result, a fast engagement of the secondary axle 30 is achieved in this manner in approximately 250 ms after the detection of a wheel slip at the primary axle 20, with the drive torque transferred to the secondary axle 30 developing in accordance with the curve F in FIG. 15 during this time.

REFERENCE NUMERAL LIST 12 drive unit
14 variable speed gearbox
16 front axle
18 front wheels
20 primary axle
22 front axle differential
24 rear axle
26 rear axle differential
28 rear wheels
30 secondary axle
32 torque diversion device
33 multi-disk clutch
34 control unit
36 torque transfer section
38 bevel gear
40 crown gear
42 differential cage
44 split axle
46 dog clutch
48 input shaft
50 transfer case
52 primary output shaft
54 multi-disk clutch
56 chain drive
58 speed of rotation sensors
60 side gear
62 clutch part
64 clutch part
66 crown wheel
68 bevel gear
70 clutch ring
72 shift fork
74 synchronization hoop
76 friction surface
78 friction surface
80 guide
82 spring ring
84 section
110 selector sleeve
112 shift fork
114 shift member
116 actuating shaft
118 housing
120 worm
122 worm wheel
124 positional sensor
126 helical compression spring
128 first end face side
130 second end face side
132 actuating ramp
134 flat ramp section
136 direction of rotation
138 steep ramp section
140 actuating pin
142 latch recess
208 split shaft
210 selector sleeve
212 end section
213 ring groove
214 shift member
218 housing section
226 helical compression spring
228 first end face side
230 second end face side
232 actuating ramp
236 direction of rotation
234 flat ramp section
238 steep ramp section
244 elevated latch portion
246 worm wheel
248 worm
250 end face
252 counter-ramp
254 flat ramp section
256 steep ramp section
258 latch recess
260 actuating projection
262 ramp region
264 ramp region
266 ramp region
268 shift fork
312 shift fork
313 shaft section
314 shift member
318 housing
319 first wall section
326 helical compression spring
327 second wall section
360 electric motor
362 spindle
364 spindle nut
366 guide bar
368 guidance opening
370 driver finger
372 driver opening
374 driver projection
376 peripheral surface
378 trigger pin
380 trigger arm
382 recess The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A clutch comprising:
    two clutch parts which can be brought into engagement in form fitted manner for the torque transfer; and
    a shift member which is movable in a first direction to bring the clutch parts out of engagement and is movable in a second direction to bring the clutch parts into engagement,
    wherein a motor is provided for the movement of the shift member in the first direction and a spring element is provided for the movement of the shift member in the second direction, and wherein a triggering of the spring element takes place by an actuation of the motor in the same direction of rotation which previously effects a tensioning of the spring element.

2. The clutch in accordance with claim 1, wherein movement of the shift member in the first direction effects a tensioning of the spring element.

3. The clutch in accordance with claim 1, wherein a ramp mechanism arranged between the motor and the shift member includes at least one actuating ramp or actuating projection and at least one counter-element which is movable relative to the actuating ramp or to the actuating projection and which cooperates with the actuating ramp or with the actuating projection such that the shift member is moved in the first direction on a running of the counter-element onto the actuating ramp or onto the actuating projection against the restoring force of the spring element.

4. The clutch in accordance with claim 3, wherein that the actuating ramp or the actuating projection is formed at the shift member.

5. The clutch in accordance with claim 3, wherein the shift member is provided with a latch recess for engaging the counter-element, or wherein the counter-element is provided with a latch recess for engaging the actuating ramp or the actuating projection.

6. The clutch in accordance with claim 3, wherein the counter-element is movable by actuation of the motor along the actuating ramp.

7. The clutch in accordance with claim 3, wherein the shift member is made in ring shape or in sleeve shape, wherein the shift member surrounds a shaft and is displaceable with respect to it, and wherein the actuating ramp or the actuating projection is made at an end face side of the shift member facing the counter-element.

8. The clutch in accordance with claim 3, wherein the spring element is arranged between an end face side of the shift member remote from the actuating ramp or from the actuating projection and an abutment.

9. The clutch in accordance with claim 3, wherein the counter-element includes a pin which projects radially from an actuating shaft which is rotatable by the motor relative to the shift member.

10. The clutch in accordance with claim 3, wherein the counter-element includes a counter-ramp which is formed at an end face side facing the shift member of a counter-gear surrounding the shaft, and wherein the counter-gear includes a worm wheel which surrounds the shaft and which is preferably in engagement with a worm driven by the motor.

11. The clutch in accordance with claim 10, wherein at least two actuating ramps or actuating projections and at least two counter-ramps are provided.

12. The clutch in accordance with claim 10, wherein the counter-gear surrounds a selector sleeve seated on the shaft, coupled to the shift member and displaceable by it relative to the shaft.

13. The clutch in accordance with claim 3, wherein the counter-element includes a counter-ramp which has a first ramp section and a second ramp section, and wherein the second ramp section drops steeply or is made in step form and includes a steeper first region, a flatter second region and a steeper third region.

14. The clutch in accordance with claim 13, wherein the first ramp section rises in a flat, and in particular linear, manner.

15. The clutch in accordance with claim 13, wherein the first ramp section rises in a non-linear manner, with the gradient of the first ramp section reducing in the direction of the highest point of the counter-ramp.

16. The clutch in accordance with claim 1, wherein the shift member is moved in the first direction only by the motor and in the second direction only by the spring element.

17. A powertrain for a motor vehicle having a permanently driven primary axle, comprising:
    a drive unit for the generation of a drive torque;
    a first clutch for the transfer of a variable portion of the drive torque to a secondary axle of the motor vehicle;
    a second clutch for the deactuation of a torque transfer section of the powertrain arranged between the first clutch and the second clutch, when the first clutch is opened; and
    a control unit for the automatic control of the first clutch, with the control unit being connected to at least one sensor for the detection of a wheel slip at the primary axle,
    wherein the second clutch includes a clutch having
    two clutch parts which can be brought into engagement in form fitted manner for the torque transfer;
    a shift member which is movable in a first direction to bring the clutch parts out of engagement and is movable in a second direction to bring the clutch parts into engagement, and
    wherein a motor is provided for the movement of the shift member in the first direction and a spring element is provided for the movement of the shift member in the second direction, and wherein a triggering of the spring element takes place by actuation of the motor in the same direction of rotation which effects a tensioning of the spring element.

18. The powertrain in accordance with claim 17, wherein the control unit is made, starting from a deactuated state of the torque transfer section, to close the second clutch in dependence on a detected wheel slip at the primary axle.

19. A clutch comprising:
    two clutch parts which can be brought into engagement in form fitted manner for the transfer of torque;
    a shift member which is moveable in a first direction to bring the clutch parts out of engagement and is movable in a second direction to bring the clutch parts into engagement;
    a motor for moving the shift member in the first direction;
    a spring element for moving the shift member in the second direction; and a ramp mechanism arranged between the motor and the shift member, the ramp mechanism includes at least one actuating ramp or actuating projection and at least one counter-element which is movable relative to the actuating ramp or to the actuating projection and which cooperates with the actuating ramp or with the actuating projection such that the shift member is moved in the first direction on a running of the counter-element onto the actuating ramp or onto the actuating projection against the restoring force of the spring element.

20. A clutch comprising:

two clutch parts which can be brought into engagement for the transfer of torque;

a shift member which is moveable in a first direction to bring the clutch parts out of engagement and in a second direction to bring the clutch parts into engagement;

a motor for moving the shift member in the first direction;

a spring element for moving the shift member in the second direction, wherein a triggering of the spring element takes place by actuation of the motor in a direction of rotation reversed with respect to the direction which previously effects a tensioning of the spring element; and a return mechanism arranged between the motor and the shift member which includes a driver device which can be brought into engagement with the shift member to draw the shift member in the first direction against the restoring force of the spring element, wherein the driver device includes a spindle driven by the motor and a spindle nut seated on the spindle, the spindle nut having a driver flange which can be brought into engagement with a projection on the shift member by rotation of the spindle nut in one direction and can be released from engagement with the projection by rotation of the spindle nut in the opposite direction.

\* \* \* \* \*